United States Patent [19]
Nagayama et al.

[11] Patent Number: 5,274,505
[45] Date of Patent: Dec. 28, 1993

[54] ELECTRICAL REMOTE-CONTROL MIRROR ASSEMBLY

[75] Inventors: Yoshirou Nagayama, Isehara; Takao Sekino, Hiratsuka, both of Japan

[73] Assignee: Ichikoh Industries, Ltd., Tokyo, Japan

[21] Appl. No.: 773,853

[22] PCT Filed: May 28, 1991

[86] PCT No.: PCT/JP91/00713
  § 371 Date: Oct. 29, 1991
  § 102(e) Date: Oct. 29, 1991

[87] PCT Pub. No.: WO91/18758
  PCT Pub. Date: Dec. 12, 1991

[30] Foreign Application Priority Data

| | | |
|---|---|---|
| May 29, 1990 [JP] | Japan | 2-137034 |
| Oct. 26, 1990 [JP] | Japan | 2-111610 |
| Oct. 26, 1990 [JP] | Japan | 2-287193 |
| Nov. 16, 1990 [JP] | Japan | 2-119298 |
| Nov. 26, 1990 [JP] | Japan | 2-122386 |
| Jan. 23, 1991 [JP] | Japan | 3-6071 |

[51] Int. Cl.$^5$ .......................... G02B 7/18; B60R 1/06
[52] U.S. Cl. .......................... 359/874; 359/877; 248/487; 74/89.75
[58] Field of Search .............. 359/872, 874, 876, 877; 248/479, 480, 481, 482, 483, 484, 485, 487; 74/89.15, 89.16

[56] References Cited

U.S. PATENT DOCUMENTS

| | | | |
|---|---|---|---|
| 4,498,738 | 2/1985 | Kumai | 359/877 |
| 4,506,954 | 3/1985 | Enomoto | 359/877 |
| 4,555,166 | 11/1985 | Enomoto | 250/634 |
| 4,632,525 | 12/1986 | Hayashi et al. | 350/634 |
| 4,678,295 | 7/1987 | Fisher | 350/634 |
| 4,696,555 | 9/1987 | Enomoto | 359/877 |
| 4,877,214 | 10/1989 | Toshiaki et al. | 359/877 |
| 4,881,418 | 11/1989 | Fimeri | 359/877 |
| 4,915,493 | 4/1990 | Fisher et al. | 359/877 |
| 4,940,321 | 7/1990 | Yoshida | 359/877 |

FOREIGN PATENT DOCUMENTS

| | | | |
|---|---|---|---|
| 0179349 | 9/1985 | Japan | 359/877 |
| 62-138648 | 9/1987 | Japan | |
| 63-87340 | 4/1988 | Japan | |

Primary Examiner—Bruce V. Arnold
Assistant Examiner—R. D. Shafer
Attorney, Agent, or Firm—Foley & Lardner

[57] ABSTRACT

An improved electrical remote-control mirror assembly in which a externally threaded plunger (54) installed to a mirror body (3) is moved by a motor (102) to adjust the support angle of a mirror (4) secured to the mirror body. In addition to the drive system using the motor (102), another motor (103) is provided which operates independently of the motor (102) to quickly rotate the externally threaded plunger (52) forwardly and reversely. Thus, the mirror assembly according to the present invention is imparted the conventional function to adjust the mirror angle and a function to quickly tilt the mirror by means of the independent driving means. The above-mentioned independently driving means permits to quickly tilt down the mirror body for viewing the reflected image of the car rear wheel and also to quickly return the mirror body (3) to the initial position thereof.

10 Claims, 18 Drawing Sheets

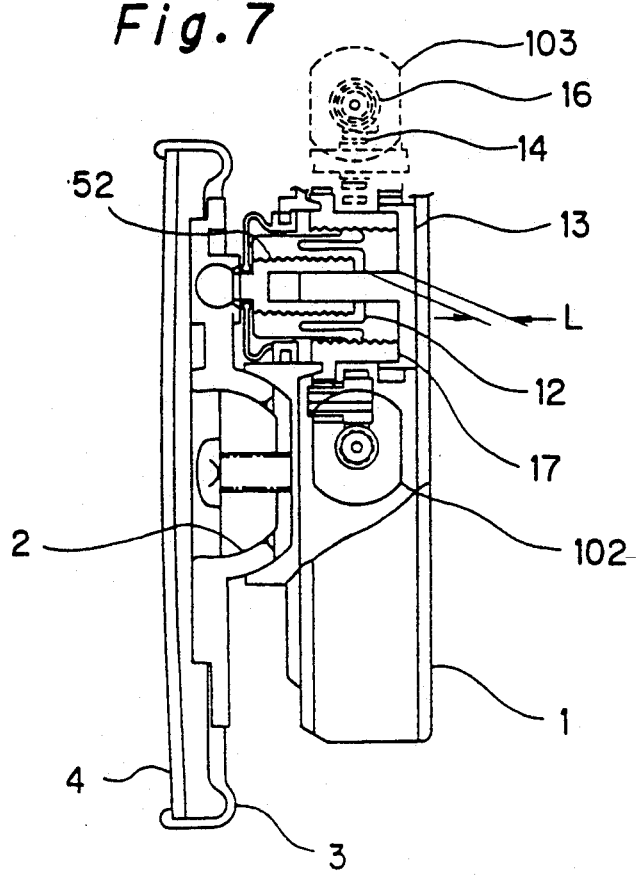
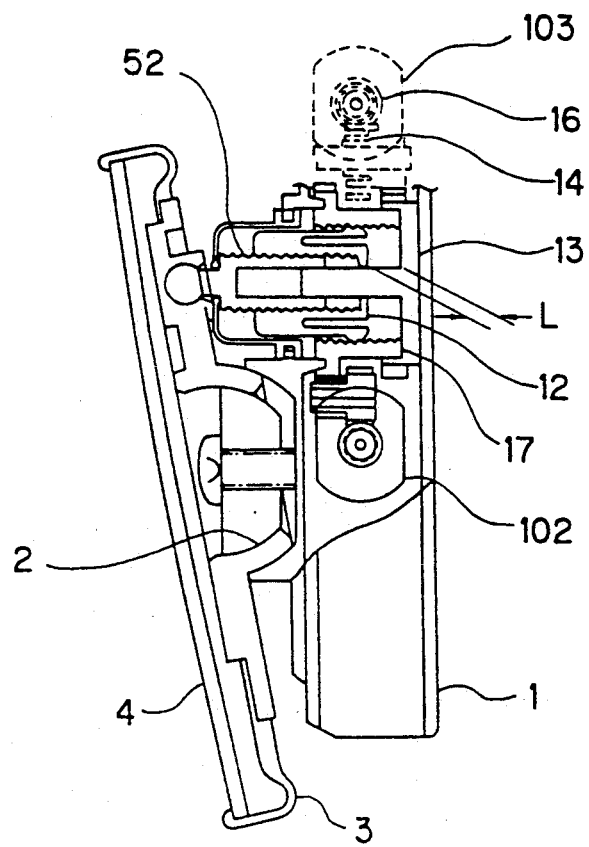

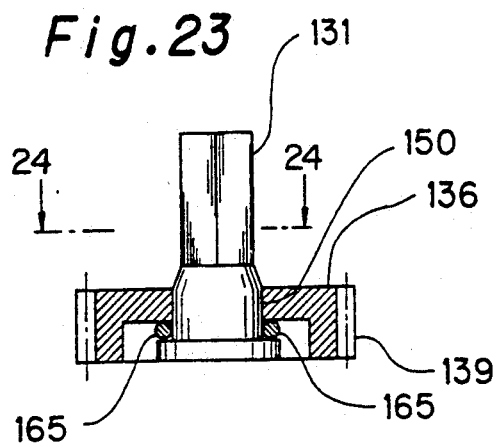
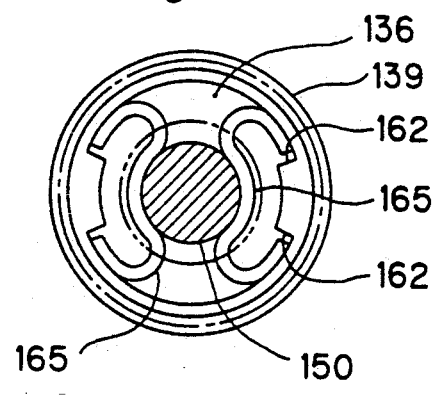
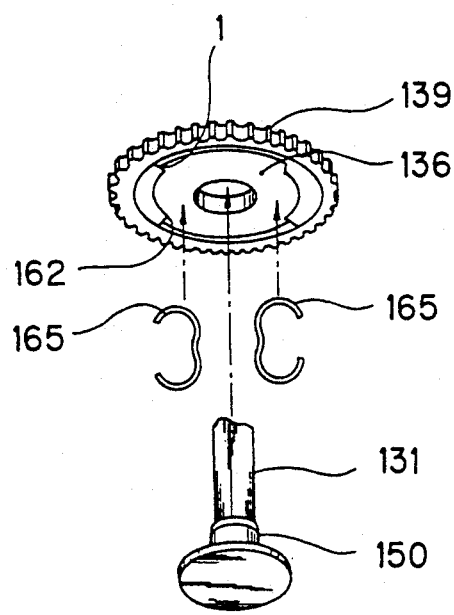
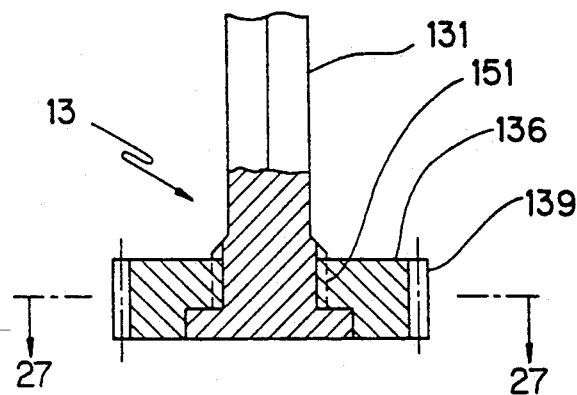
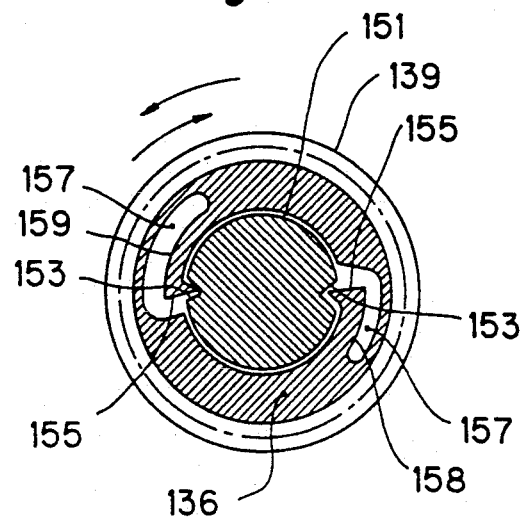

ELECTRICAL REMOTE-CONTROL MIRROR ASSEMBLY

BACKGROUND OF THE INVENTION

1. Field of the Invention

The present invention relates to a remote-controlled rearview mirror assembly such as automobile door mirror assembly, of which the mirror is supported tiltably relative to the housing thereof, and more particularly, to an improved and novel electrical remote-control mirror assembly, of which the mirror can be tilted down quickly and easily at any time for viewing the rear wheel and its vicinity of the car.

2. Prior Art Statement

An electrical remote-control automobile mirror assembly is disclosed in, for example, the U.S. Pat. No. 4,555,166, of which the mirror is supported tiltably relative to the housing thereof and can be turned vertically and horizontally by means of remote-controlled motors.

FIGS. 1 and 2 show an example of the well-known electrical remote-control mirror assembly of this type.

FIG. 1 is a front view showing the drive unit from which the mirror body is removed, the casing 1 of the drive unit being partially cut off. FIG. 2 is a sectional view taken along the line II—II, showing the drive unit on which the mirror body is attached.

Two axes X-X' and Y-Y' perpendicular to each other are set as shown in FIG. 1. There is provided at the intersection O of these axes a ball-and-socket joint 2 by which the mirror body 3 is tiltably supported as shown in FIG. 2. The reference numeral 4 indicates a mirror proper.

As shown in FIG. 1, plungers 5 are provided on the axes X-X' and Y-Y', respectively. The plunger 5 has provided at the end thereof a ball-and-socket joint 6 coupled to the mirror body 3, as shown in FIG. 2. The plunger 5 has formed axially therein a recess 7 in which a projection 8 provided on the drive casing 1 is engaged against axial pivoting of the plunger 5, and it has fitted thereon a gear 9 at the last speed reduction step. The gear 9 is rotated by a motor 10 by means of a speed reduction gear group 11.

As described above, the plunger 5 is blocked against axial pivoting and has formed on the outer circumference thereof a thread which is in mesh with the gear 9. Thus, as the gear 9 is rotated, the plunger 5 is axially driven to tilt the mirror body 3.

The adjusting range of the angular position of the mirror 4 tilted by the above-mentioned drive unit (see FIGS. 1 and 2) is so set as to cover the necessary range for an ordinary driving of the car on the road. Also, the tilt speed of the mirror body 3 is limited to such an extent that it can be adjusted with an accuracy required in practice. This is because if the mirror body is tilted too quickly, it is rather difficult to adjust the tilt angle to a desired one.

However, in any special driving of the car, for example, when moving the car backward in the vicinity of a road edge or in the direction of its width, it is desired to have a vision of the rear wheel and its vicinity, of which the image is viewed as reflected by the door mirror (this vision will be referred to as "reflected image" hereinafter).

FIG. 3 is an explanatory drawing showing the viewing, by means of a door mirror, of the rear wheel and its vicinity.

The point "Eye" in FIG. 3 is the position of the driver's eyes. In the ordinary driving of a car, the door mirror posture (theoretically a door mirror angle relative to the road surface, or practically a door mirror angle relative to the car body; this will be referred to as "mirror angle" hereinafter) is so adjusted as to view the reflected image within the angular range $b$ in FIG. 3 for the purpose of knowing the position of a car behind or the like.

When moving the car backward in the vicinity of a road edge, the reflected image within the angle $\phi$ in FIG. 3 can desirably be viewed by tilting down the mirror body. To this end, it is required that the rear wheel should be within the angular range $\phi$ and that the road surface over the distance L necessary for knowing the position of the car behind should also be within this angular range $\phi$.

For the driver to view the reflected image of the rear wheel and its vicinity, the door mirror should be tilted down through a predetermined angle from the mirror angle set for the ordinary driving of the car. Varying from one car model to another, the predetermined angle ranges from 5° to 7°. Concerning a certain car model, the predetermined angle is generally constant irrespective of the driver's sitting height.

Indeed in the conventional remotely controllable door mirror, the range of the mirror tilt by the drive unit can be increased so that the driver can get a vision of the rear wheel and its vicinity, but the following inconvenience remains in such case:

(a) If the adjusting range of the mirror angle is increased with the mirror tilt speed not changed, the time taken for the mirror operation is longer;

(b) If the mirror tilt speed is increased correspondingly to the increase of the adjusting range of the mirror angle, no accurate operation can be ensured in remote control of the mirror angle for the ordinary car driving; or (c) Further in any of the above two cases, when a position in which the mirror angle is so set that the reflected image within the angular range $\theta$ shown in FIG. 3 can be viewed (which position will be referred to as "rear-viewing position for ordinary car drive" hereinafter) has been followed by a state in which the mirror angle is so set that the reflected image within the angular range $\phi$ shown in FIG. 3 can be viewed (which position will be referred to as "rear-viewing position for rear-wheel check" hereinafter) and further when the rear-viewing position for ordinary car drive is restored thereafter, the mirror is not in the rear-viewing position for ordinary car drive, thus causing an inconvenience because the mirror angle must be readjusted to set the mirror in the rear-viewing position for ordinary car drive.

The present invention has an object to overcome the above-mentioned drawbacks of the convention techniques by providing an electrical remote-control mirror assembly, which permits a quick and easy shift between the rear-viewing positions for ordinary car drive and rear-wheel check, respectively, without any influence on the operating accuracy of the remote control and ensures, because an mirror angle adjusted for the rear-viewing position for ordinary car drive is set as reference or initial angle, an accurate return to the initial position, namely, to the rear-viewing position for ordinary car drive when the remote control is operated for shift from the rear-viewing position for rear-wheel check to that for ordinary car drive.

SUMMARY OF THE INVENTION

The above object can be attained by providing an electrical remote-control mirror assembly wherein a mirror body supporting a mirror is supported tiltably relative to a mirror drive casing, a pair of plungers is provided in the drive unit, each of the plungers has an external thread formed on the outer circumference thereof and is coupled at one end thereof to the mirror body by means of a ball-and-socket joint and the plunger is further adapted to be moved forwardly (namely, in the direction of extension) and reversely (namely, in the direction of retraction) by means of a thread member engaged in the plunger, comprising, at least one of the plungers having a central hole provided along the center line; at least a drive shaft slidably fitted in the plunger so as to be blocked against pivoting relative to the central hole; at least a nut member having an internal thread engaging the external thread of the plunger; at least an external-thread member provided on the outer circumference of the nut member and which serves as external thread; at least a drive cylinder having an internal thread engaging the external-thread member; a motor adapted to rotate the drive cylinder forwardly and reversely; another motor adapted to rotate the drive shaft forwardly and reversely, independently of the forward or reverse rotation of the drive cylinder by the first motor, thereby moving the externally-threaded plunger relative to the nut member; and a stopper means to limit the pivoting angle of the mirror body.

In this structure of the mirror assembly, when the external thread member provided on the outer circumference of the nut member is moved by rotating the drive cylinder, the nut member is moved while the engaged relation between the plunger and external thread member is kept unchanged, thereby move the plunger forwardly and reversely. Thus, the mirror assembly performs its conventional remote control function.

Thus, when the drive shaft is rotated forwardly and reversely independently of the nut member, the plunger is rotated and the nut member is moved.

Thus, in addition to the ordinary remote control function, the mirror assembly has a function to temporarily tilt down the mirror to the rear-viewing position for rear-wheel check and also a function to restore the rear-viewing for ordinary car drive. These operations can be done independently of the nut member. Since the nut member is not rotated, an accurate return to the initial position (rear-viewing position for ordinary car drive) can be ensured with no influence on the support angle of the mirror in the rear-viewing position for ordinary car drive.

Irrespectively of the adjustment of the support angle of the mirror for the rear-viewing position for ordinary car drive, the mirror titled down abuts the stopper as the plunger is moved forwardly by means of the drive shaft and thus the tilting is stopped.

BRIEF DESCRIPTION OF THE DRAWINGS

FIGS. 4 to 11 show one embodiment of the electrical remote-control mirror assembly according to the present invention; of which FIG. 4 is a front view of the mirror assembly according to the present invention with the mirror omitted;

FIG. 5 is a sectional view, enlarged in scale, of the mirror assembly with the essential portion of the mirror assembly;

FIG. 6 is a schematic sectional view of the torque limiter;

FIGS. 7 to 11 are explanatory drawings, respectively, in which no hatching is made for the convenience of illustration;

FIGS. 12 to 14 show a second embodiment of the mirror assembly according to the present invention, of which FIG. 12 is a sectional view corresponding to FIG. 5 for the first embodiment;

FIG. 13 is a sectional view showing the essential portion of the mirror assembly, illustrating the operations of the mirror assembly;

FIG. 14 is an exploded perspective view of the components shown in FIG. 13;

FIGS. 15 to 19 show a first variant of the present invention, of which

FIG. 15 is a sectional view to explain the relation between the external thread on the plunger and the internal thread of the nut member;

FIG. 16 is a sectional view taken along the plane perpendicular to the section in FIG. 15;

FIG. 17 is an exploded perspective view of the components shown in FIG. 15;

FIG. 18 is a perspective view, enlarged in scale, in which the plunger shown in FIG. 17 is viewed in the direction of arrow B;

FIG. 19 is an end view in which the plunger shown in FIG. 18 is viewed in the direction of arrow C;

FIGS. 20 to 22 show a second variant of the present invention, of which

FIG. 20 is a sectional view to explain the relation between the base gear and drive shaft;

FIG. 21 is a sectional view taken along the line XXI—XXI in FIG. 20;

FIG. 22 is an exploded perspective view of the components shown in FIG. 20;

FIGS. 23 to 25 show a third variant of the present invention, of which

FIG. 23 is a sectional view to explain the relation between the base gear and drive shaft;

FIG. 24 is a sectional view taken along the line XXIV—XXIV in FIG. 23;

FIG. 25 is an exploded perspective view of the components shown in FIG. 23;

FIGS. 26 to 29 show a fourth variant of the present invention, of which

FIG. 26 is a sectional view to explain the relation between the base gear and drive shaft;

FIG. 27 is a sectional view taken along the line XXVII—XXVII in FIG. 26;

FIG. 28 is an explanatory drawing showing the engagement;

FIG. 29 is a plan view of the base gear;

FIGS. 32 and 33 show a third embodiment of the present invention, of which

FIG. 32 is a sectional view corresponding to FIG. 5 for the first embodiment;

FIG. 33 is an exploded perspective view of the plunger and nut member;

FIGS. 35 to 38 show an eighth variant of the present invention, of which

FIG. 35 is an exploded perspective view corresponding to FIG. 33 for the third embodiment;

FIG. 36 is an explanatory drawing showing the installation of the circular Z-shaped spring; and FIGS. 37 and 38 are explanatory drawings of the function and effect of the present invention.

DETAILED DESCRIPTION OF THE PREFERRED EMBODIMENTS

Figure 1:
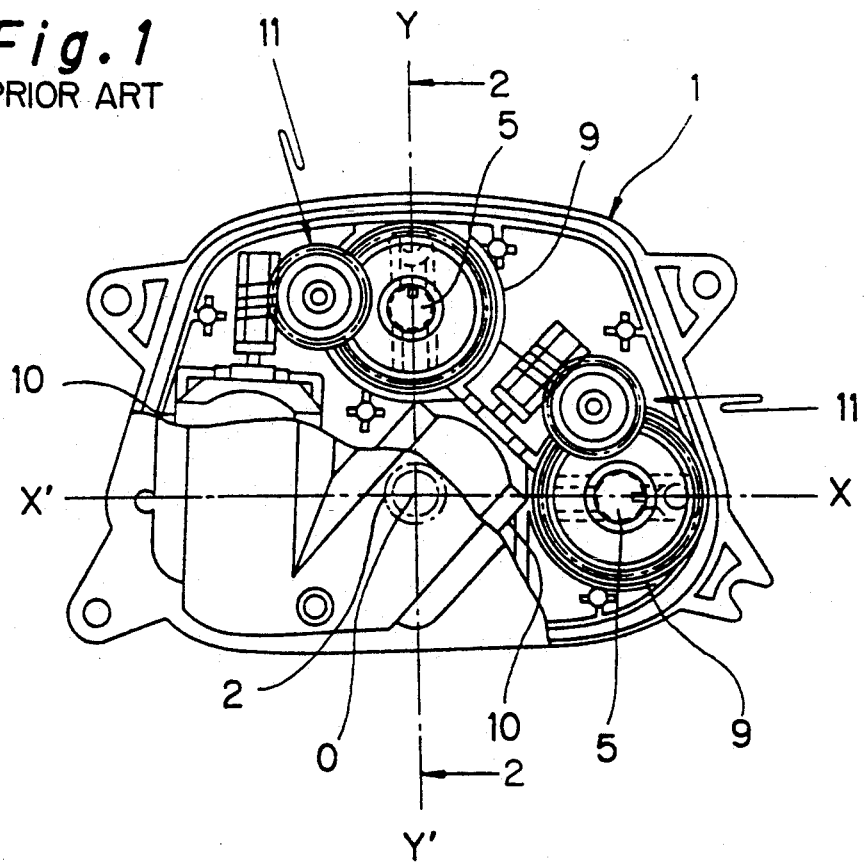
FIG. 1 is a front view of a conventional electrically operated remotely-controllable type mirror assembly with the drive unit shown as partially cut off.
Figure 2:
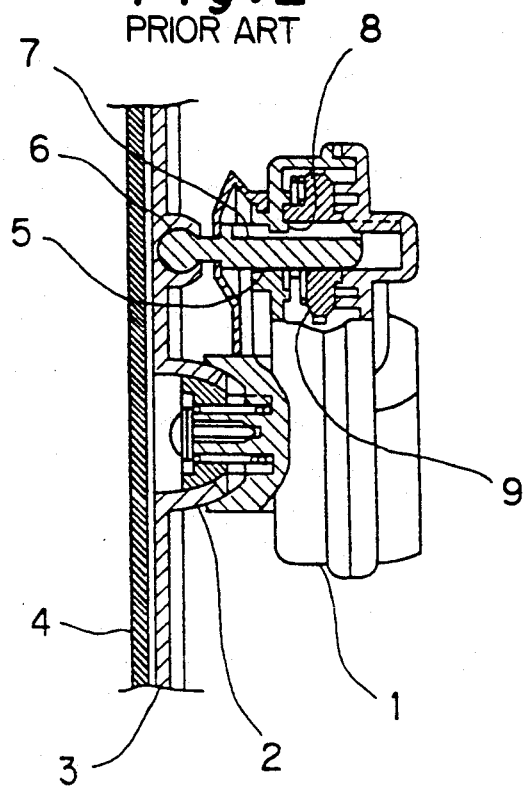
FIG. 2 is a partially fragmentary, side-elevational sectional view, taken along the line II—II, of the mirror assembly in FIG. 1, showing the fixation of the mirror and mirror body to the drive unit.
Figure 3:
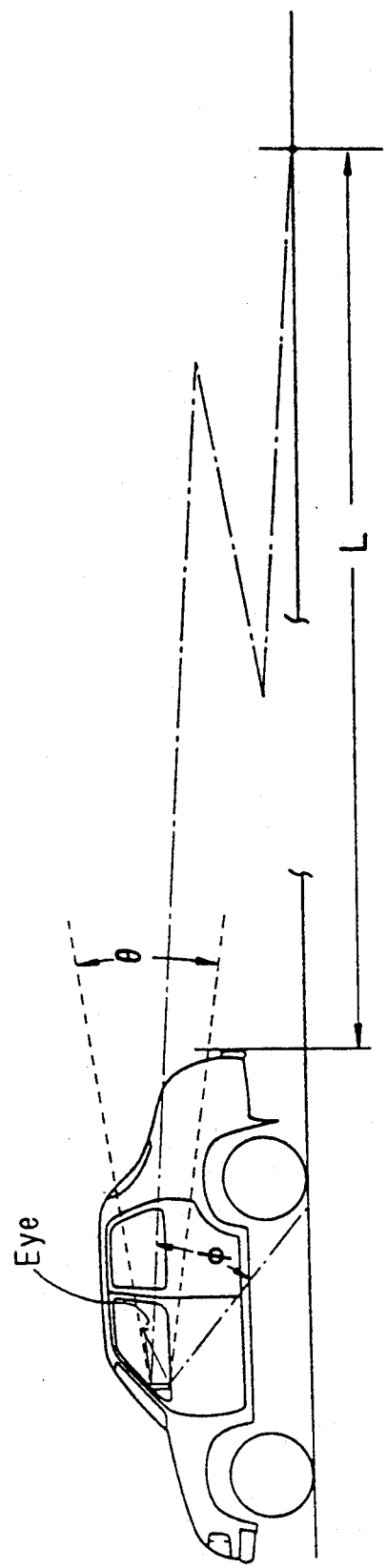
FIG. 3 is an explanatory drawing showing the relation between the mirror angle and reflected image.
Figure 4:
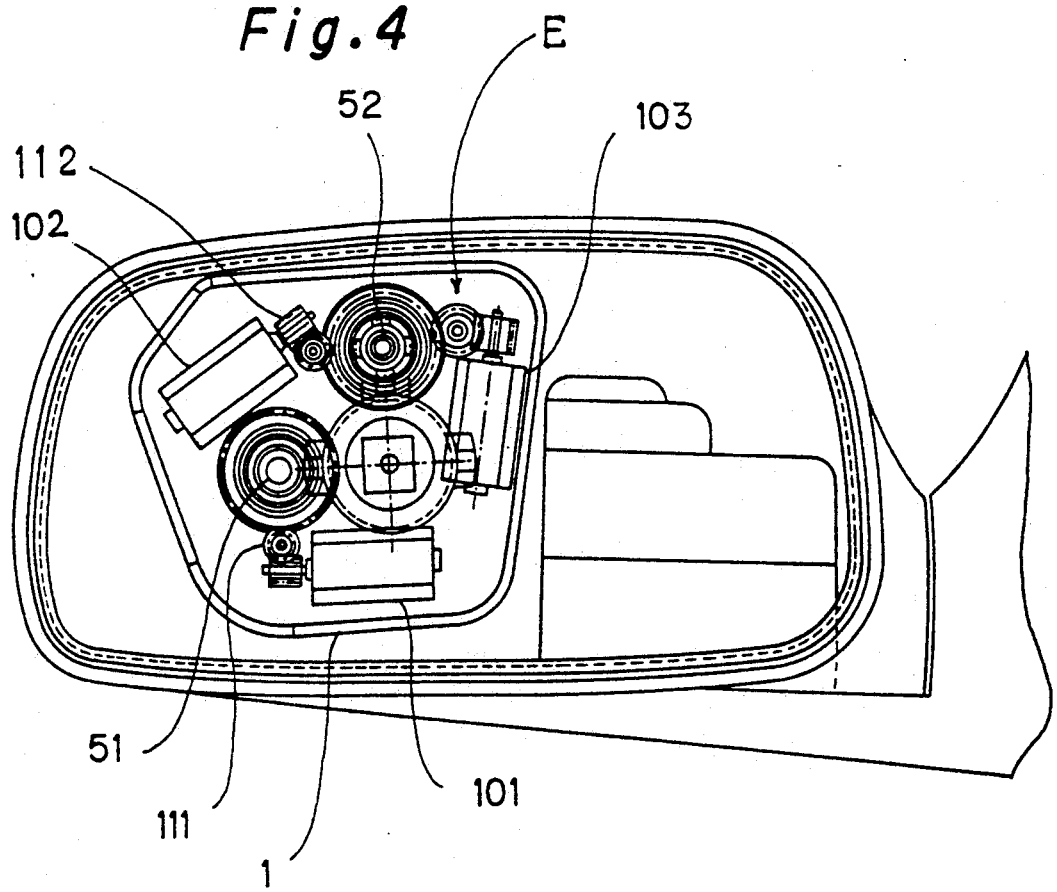

FIG. 4 is a front view of the drive unit in the first embodiment of the mirror assembly according to the present invention, with the mirror omitted.

The drive unit has a casing 1 in which a plunger 51 for turning the mirror horizontally and a plunger 52 for turning the mirror vertically are provided and driven by motors 101 and 102, respectively, via reduction gear groups 111 and 112, respectively.

The mechanism composed of the plunger 51, motor 101, reduction gear group 111, etc. and intended for turning the mirror horizontally is similar to that in the previously mentioned conventional mirror assembly, but the mechanism composed of the plunger 52, motor 102 and reduction gear group 112 and so forth and intended for turning the mirror vertically comprises a mirror tilting mechanism E intended for rear-wheel check, which will be discussed below with reference to FIG. 5.

Figure 5:
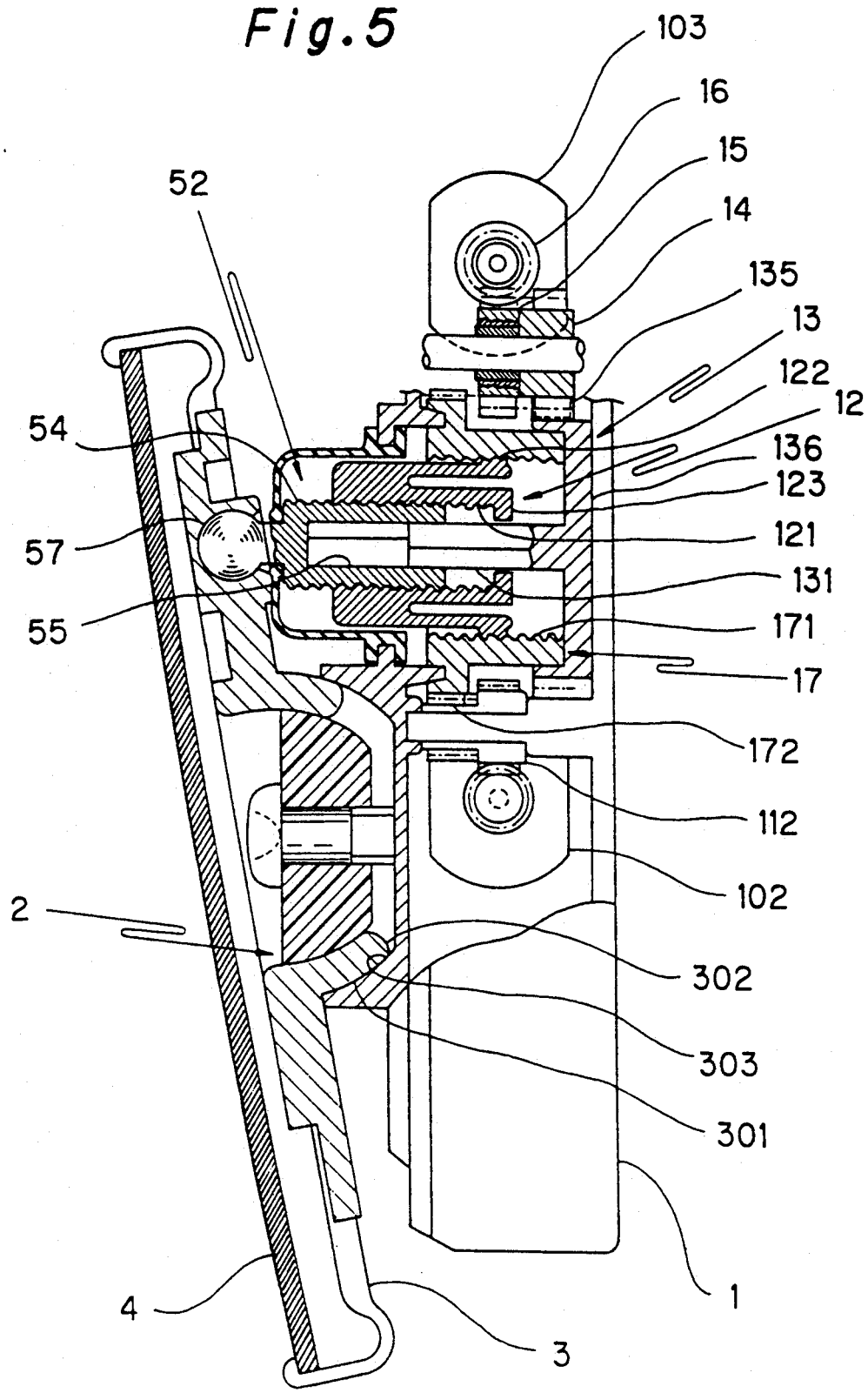

FIG. 5 is a schematic sectional view taken along the line passing near the above-mentioned mirror tilting mechanism E for rear-wheel check. This Figure is drawn for easy knowing of the construction and function.

The upper portion of FIG. 5 corresponds to the upper portion of the mirror assembly; however, the arrangement of components of the mirror assembly shown at the upper and lower portions of Figure is not necessarily precisely as in the embodiments of the present invention.

The reference numeral 1 shows a drive casing which supports a mirror body 3 tiltably by means of a ball-and-socket joint 2.

The reference numeral 4 indicates a mirror secured and supported to the mirror body 3.

The above-mentioned ball-and-socket joint 2 consists of a spherical portion 301 formed integrally with the mirror body 3 and a spherical concave seat 303 formed on the drive casing 1.

As the mirror body 3 is pivoted further counterclockwise (downward) from the position illustrated in FIG. 5, the front end 302 of the spherical portion 301 abuts the bottom of the spherical concave seat 303 and acts as stopper.

The reference numeral 52 indicates a tubular plunger having an external thread 54 formed on the outer circumference thereof and also a square hole 55 formed therein. The plunger 52 is provided at the end thereof with a ball 57.

The reference numeral 12 indicates a nut member engaging the plunger 52 and which moves it. This nut member 12 has formed therein an internal thread 121 engaging the external thread 54 and also has formed integrally on the outer circumference thereof a leaf spring-like externally threaded piece 122 having a flexibility.

The reference numeral 13 indicates a transmission member which rotates the plunger 52. This member 13 has a square drive shaft 131 provided in the center thereof.

The square drive shaft 131 is slidably fitted in the square hole 55 of the plunger 52.

The transmission member 13 has provided on the circumference thereof teeth 135 which are rotated as coupled to a motor 103 by means of a torque limiter 14, spur gear 15 and worm gear 16.

Figure 6:
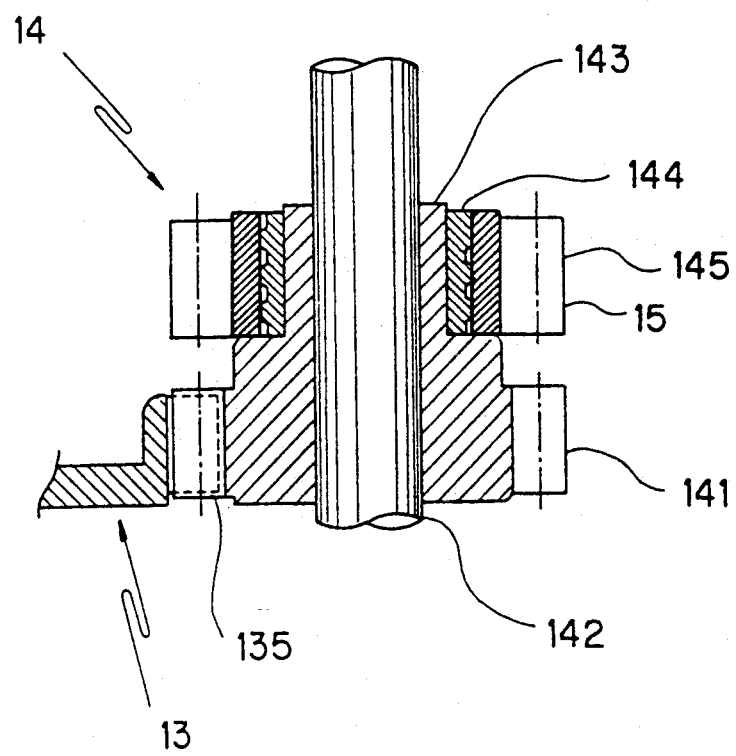

The torque limiter 14 is a mechanism which causes a slip and interrupts the power transmission when it receives a greater torque than predetermined while it causes no slip and thus assures the power transmission when the torque received is smaller than predetermined. The sectional view of this torque limiter 14 is shown as enlarged in scale in FIG. 6.

There is provided a spur gear 141 rotatably fitted on a gear shaft 142 and in mesh with teeth 135 of the transmission member 13.

The spur gear 141 has provided integrally therewith a frictional transmission cylinder 143 on which a rubber bush 144 is fitted. The frictional transmission cylinder 143 has a ring gear 145 fitted thereon.

When the transmission torque is smaller than predetermined, a frictional transmission is made between the spur gear 15 and rubber bush 144. However, when the transmission torque is greater than predetermined, a slip is caused to interrupt the power transmission.

As seen from FIG. 5, when the motor 102 is made to run forwardly or reversely with the motor 103 stopped, the drive cylinder 17 is rotated forwardly or reversely by means of the reduction gear group 112 including gear 172.

The externally threaded piece 122 of the nut member 12 is engaged with an internal thread 171 of the drive cylinder 17, and the nut member 12 is guided by a guide means (not shown) in the axial direction while blocked against any rotation relative to the drive casing 1.

Thus, the nut member 12 is moved as the drive cylinder 17 is rotated. Since the plunger 52 is engaged, at the external thread 54 on the outer circumference thereof, in the nut member 12 and blocked against rotation by the square drive shaft 131, it is moved together with the nut member 12 to tilt the mirror body 3 vertically by means of the ball 57.

Also, when the motor 103 is put into run with the motor 102 stopped, the transmission member 13 is turned and the square drive shaft 131 moves the plunger 52.

When the plunger is moved forwardly, the mirror body 3 is tilted down.

When the end 302 of the spherical portion 301 of the ball-and-socket joint 2 abuts the bottom of the spherical concave seat 303 due to the down-tilt, the mirror body 3 is stopped from tilting and thus the torque limiter 14 causes a slip.

Also, when the plunger 52 is moved reversely until it abuts the flange-like stopper 123 in the nut member 12, then the torque limiter 14 causes a slip.

As mentioned above, the mirror body 3 is tilted by the motor 102 and also by the motor 103, but the tilting by one motor is independent of that by the other motor.

In this embodiment, the speed of the motor 103 is about 1.56 times higher than that of the motor 102.

Further, the gear ratio of the transmission gear of the reduction gear group 112 is about 2.3 larger than that of the reduction gear group 111.

Therefore, the mirror body 3 is tilted by the motor 102 at a speed of 3.3 sec/10 deg, and by the motor 103 at a speed of 0.5 sec/10 deg. Namely, the mirror body 3 is tilted very quickly by the motor 103.

FIG. 7 shows the position where the remote-control mirror assembly in FIG. 5 (embodiment) is set for rear-viewing in ordinary car drive. The operator uses the remote control to run the motor 102 for a desired magnitude of the dimension L shown in FIG. 7 depending upon his sitting height or for any other reason to adjust the support angle of the mirror 4 as necessary.

When the motor 103 runs from the position shown in FIG. 7 and moves the plunger 52 in the extending direction, the position shown in FIG. 8 is attained in which the ball-and-socket joint 2 is fully rotated and acts as stopper, and thus the torque limiter 14 is activated to stop the mirror turn. In this state, the dimension L in FIG. 8 remains unchanged from that shown in FIG. 7.

When the motor 103 runs again and retracts the plunger 52, the mirror body 3 is retracted and reaches the position in FIG. 7 while the dimension L remains unchanged. The plunger 52 is retracted to the end of stroke relative to the nut member 12 until the torque limiter 14 starts causing a slip. Here, the mirror body 3 is completely returned to the initial position (rear-viewing position for ordinary car drive).

As having been described above, shift can be made between the rear-viewing positions for ordinary car drive and rear-wheel check, respectively, through the remote control of the motor 103 without any change of the dimension L (upon which the angular position of the mirror body 3 in the rear-viewing position for ordinary car drive depends) having been adjusted in accordance with the conditions of each driver; the support angle of the mirror in the ordinary drive before the mirror body 3 takes the rear-viewing position for rear-wheel check can be accurately restored (while the dimension L remains unchanged); and the shifting operation is done as driven by the motor 103 and so it can be done quickly at an angular velocity 6 times higher than in the adjustment of the support angle of mirror by the motor 102.

In this positional shift of the mirror body 3, the end of tilting stroke of the mirror body 3 is determined by the stopping means. Namely, the down-tilt stroke of the mirror body 3 (to the rear-viewing position for rear-wheel check) in this embodiment is determined by the pivoting limit of the ball-and-socket joint 2, while the up-tilt stroke (when the mirror body 3 is set to the rear-viewing position for ordinary car drive) is determined by the limit of retraction of the plunger 52 relative to the nut member 12.

Therefore, no precise stopping operation at the middle of the tilting stroke is required and the mirror body 3 can be stopped with a high accuracy even with the quick shift operation.

Further, as shown in FIG. 5, the mechanism for movement by screw, driven by the motor 102 and the mechanism for movement by screw, driven by the motor 103 can be designed compact because their respective drive cylinder 17, drive shaft 12 and plunger 52 form together a three-walled telescopic structure.

Figure 9:
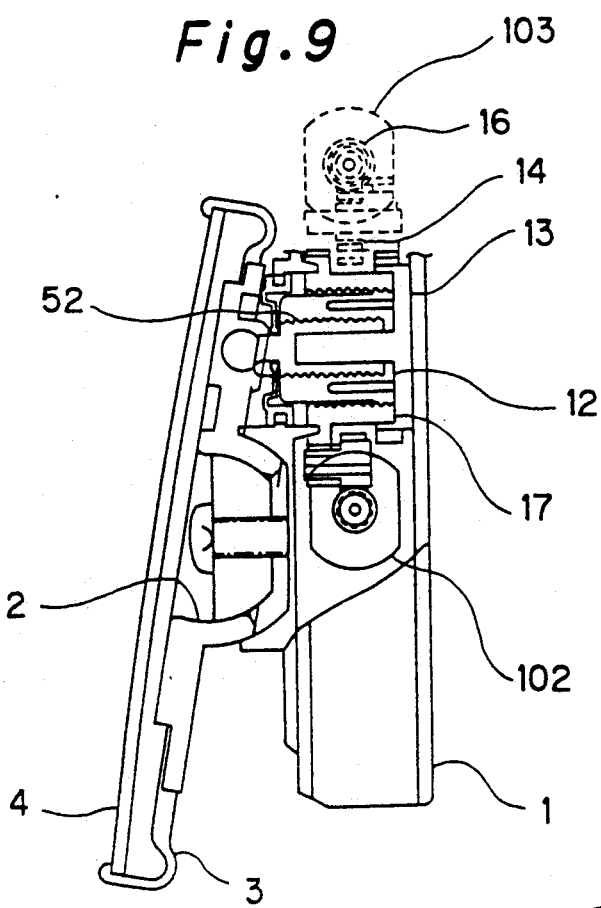

FIG. 9 is an explanatory drawing showing the mirror body 3 tilted up through a relatively large angle when in the rear-viewing position for ordinary car drive. As seen, the mirror body 3 is tilted up to the extreme position (full stroke) and the dimension L in FIG. 7 is zero.

Figure 10:
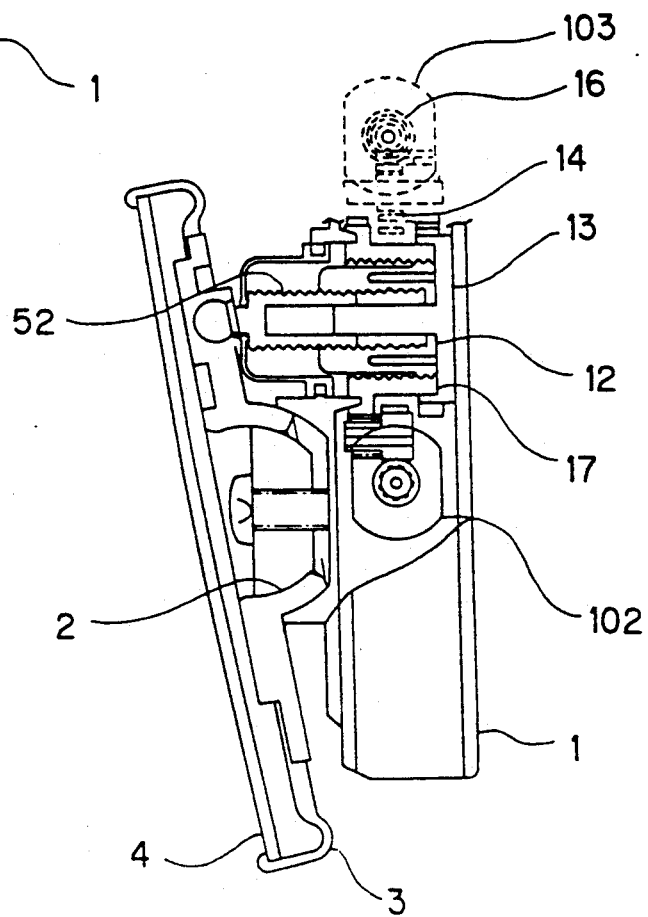

Even when the motor 103 runs from this position, the mirror body 3 is tilted down to the pivoting limit of the ball-and-socket joint 2 as shown in FIG. 10.

The rear-viewing position for rear-wheel check shown in FIG. 8 differs in initially adjusted dimension L for the rear-viewing position for ordinary car drive from that shown in FIG. 10, while the angular position of the mirror body 3 remains unchanged (at the pivoting limit of the ball-and-socket joint 2).

Figure 11:
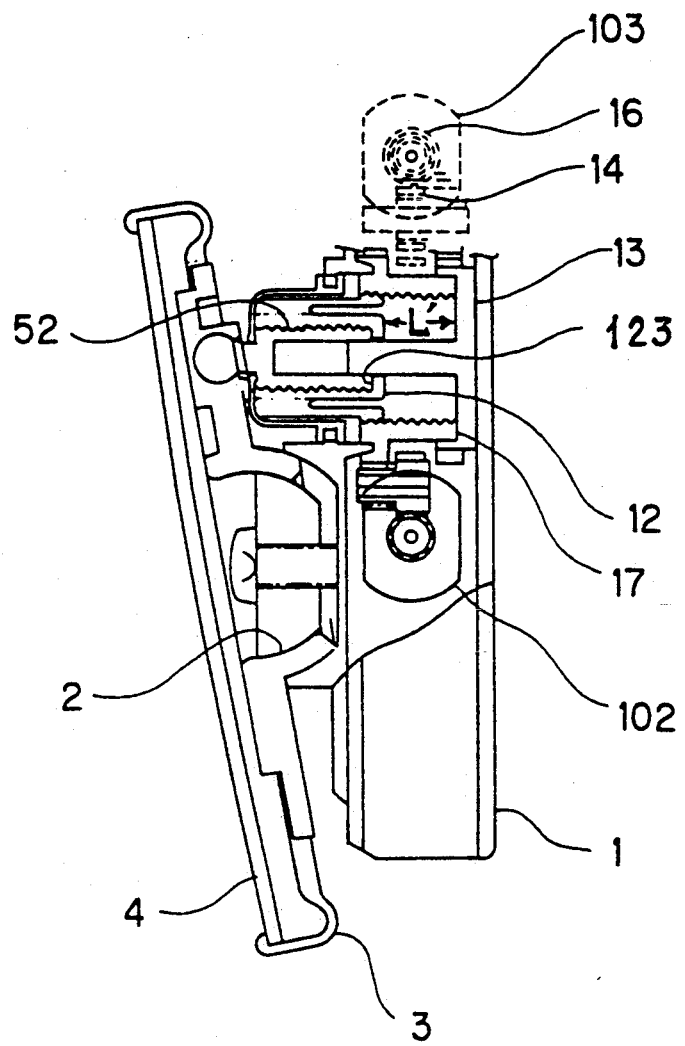

FIG. 11 shows the position where the mirror body 3 takes the maximum down-tilt angle for the rear-viewing position for ordinary car drive, and this position is shown here for better understanding, through comparison, of the above-mentioned operations of this embodiment.

For the mirror body 3 to take the above position, the drive cylinder 17 is turned as driven by the motor 102 to move the nut member 12, thereby extending the plunger 52 (to the left of FIG. 11) while it is kept not rotated.

When the plunger 52 abuts the flange-like stopper 123 in the nut member 12, that is, when it is at the end of retracting stroke, the spacing L' between the nut member 12 and transmission member 12 is L' >> L. Namely, the mirror body 3 is already in the rear-viewing position for rear-wheel check. At this time, the mirror body 3 is not tilted down by the motor 103.

As having been described in the foregoing, this first embodiment permits a quick and easy changeover between the positions for the ordinary drive and rear-wheel check, respectively, without any influence on the operating accuracy of the remote control and ensures, because a mirror angle adjusted for rear-viewing in ordinary car ordinary drive is taken as reference or initial position of the mirror, an accurate return to the rear-viewing for ordinary car drive when the remote control is operated for shift from the rear-viewing position for rear-wheel check to that for ordinary car drive.

FIG. 5 is a vertical sectional view showing the first embodiment of the present invention, and FIGS. 6 to 10 are schematic vertical sectional views, respectively, for explanation of the mirror positioning operations. Variants of the first embodiment can be derived from these Figures (FIGS. 5 to 10) which can be regarded as horizontal sectional views, respectively. According to such variant, the mirror can be temporarily turned horizontally and returned to the original position. The door mirror according to this variant is very useful for a wider horizontal field of vision when the car runs through a joint of highways.

Next, the second embodiment of the present invention will be described herebelow with reference to FIGS. 12 to 14.

Figure 12:
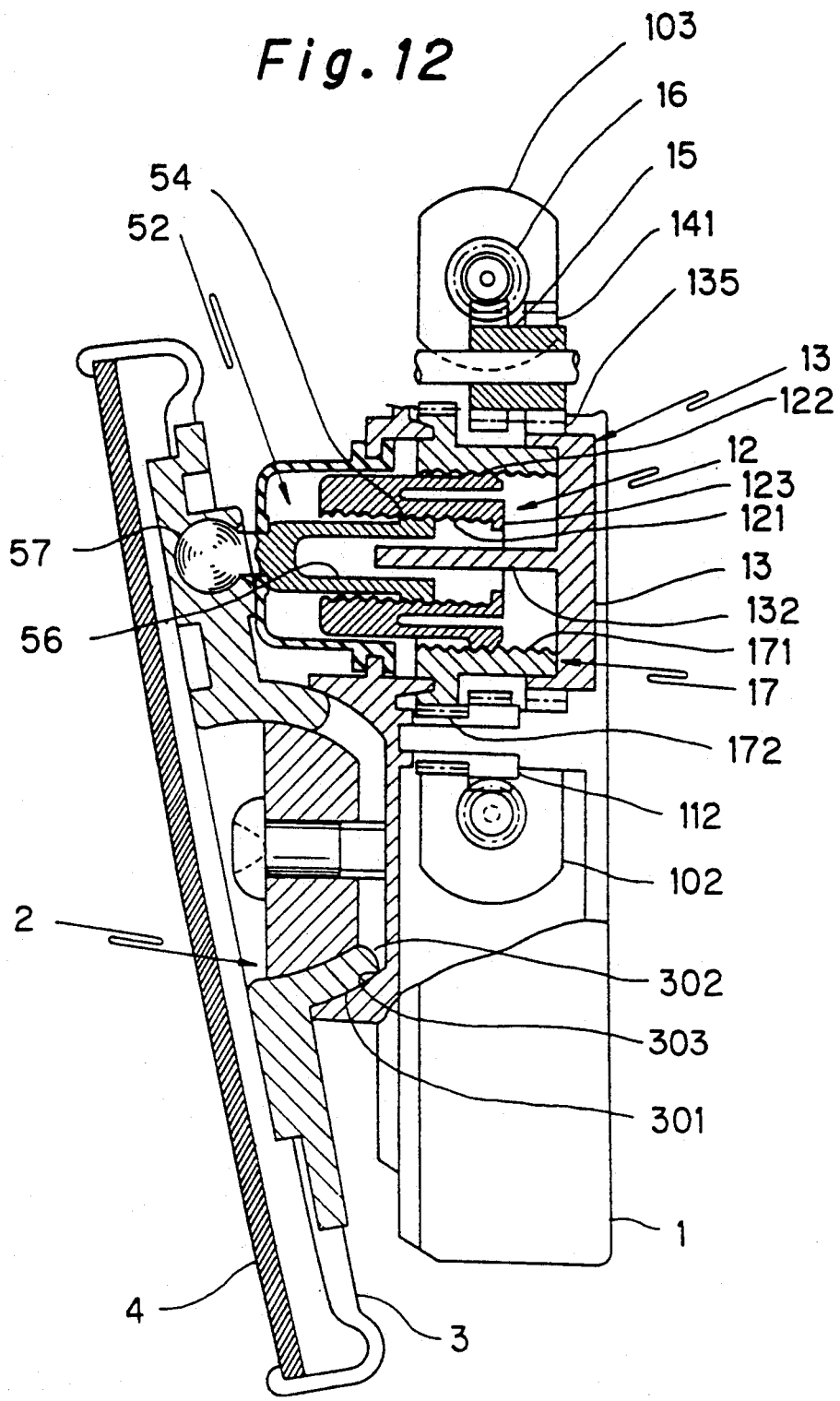

FIG. 12 is a sectional view corresponding to FIG. 5 for the aforementioned first embodiment. Note that the elements indicated in FIG. 12 with the same or similar reference numerals as or to those used in FIG. 5 are the same as or similar to those in the first embodiment.

In the second embodiment, a spur gear 15 transmitting the power of a motor 103 and spur gear 141 provided at a next stage and which transmits the power as reduced are coupled together. So no slip takes place in this portion. When an excessive torque is applied, the power transmission is interrupted by idling a plunger 52 relative to a nut member 12 as will be described below. The plunger 52 has a cut 56 formed therein, and so it has the form of a tuning fork. An external thread 54 is formed at the end portion thereof. This will be described in further detail with reference to FIG. 14. The nut member 12 is engaged on the plunger 52 and moves the latter. This nut member 12 has formed therein an internal thread 121 which engages the external thread 54 of the plunger 52. And an externally threaded flexible piece 122 having the form of a leaf spring is integrally provided on the outer circumference of the nut member 12. The reference numeral 13 indicates a transmission member to rotate the plunger 52. This member 13 has a drive shaft 132 provided in the center thereof. The drive shaft 132 is slidably fitted in the cut 56 of the plunger 52 with a large clearance between them. Further detail will be described below with reference to FIG. 13.

Figure 13:
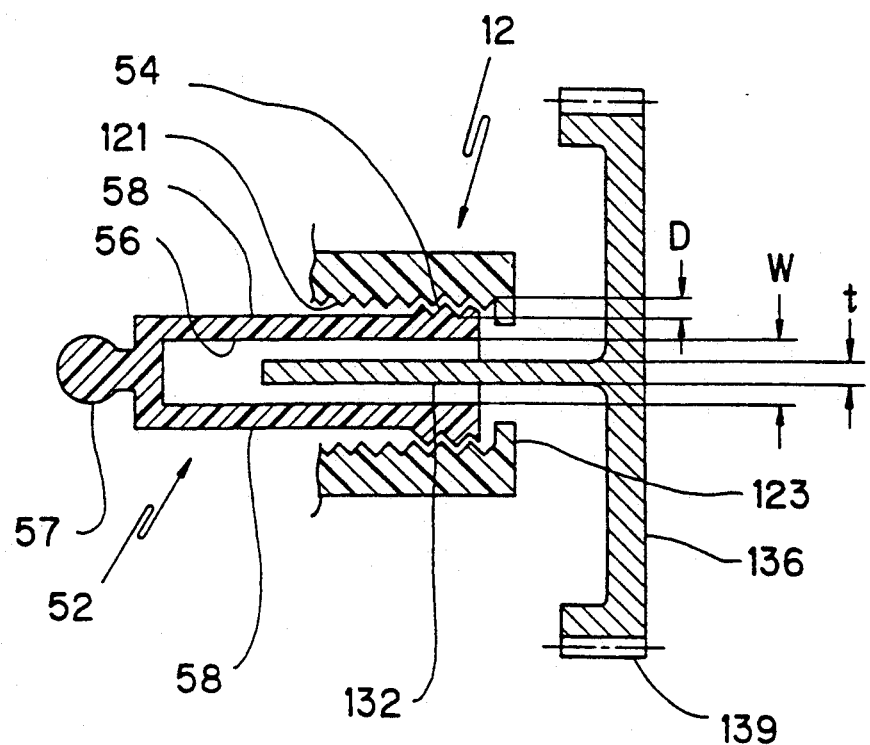
Figure 14:
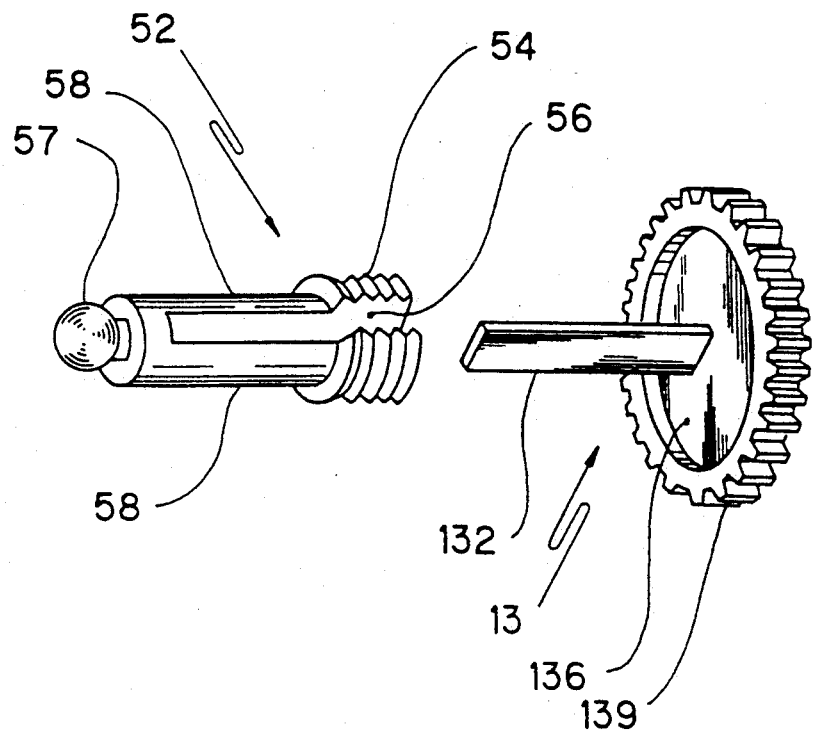

FIG. 13 is a schematic sectional view of the plunger 52 and its vicinity, and FIG. 14 is an exploded perspective view of the same.

The plunger 52 has a ball 57 secured to one end thereof and a cut 56 formed from the other end thereof, and thus it takes the form of a tuning fork as mentioned above.

There is formed on the end portion of the tuning fork an external thread 54 which is engaged in the nut member 12.

On the other hand, the drive shaft 132 takes the form of an elongated plate of t in thickness, and it is formed integrally with a base gear (spur gear) 136.

A pair of arms 58 having the cut 56 between them and thus forming together the tuning fork is flexible. The arms 58 are opposite to each other with a spacing W between them.

The above dimension W is set so that W−t>2D where D is an amount of fitting between the external thread 54 and the internal thread of the nut member 12.

When the base gear 136 is rotated and thus the drive shaft 132 rotates the plunger 52, the external thread 54 of the plunger 52 is moved by the nut member 12. When the plunger 52 is blocked against forward and reverse movement, the arms 58 are deflected so that a disengagement occurs between the external screw 54 and the internal thread of the nut member 12.

For the above idling of the plunger 52, it is necessary that 2D should be smaller than W−t.

As mentioned above, the mirror body 3 is tilted by both the motors 102 and 103, respectively. Namely, the tilting by the motor 102 is done independently of that by the motor 103. When the mirror body 3 is tilted to the end of tilting stroke and thus the stopper is activated, the external thread 54 is disengaged from the nut member 12 and so the base gear 136 rotates idly.

In the previously described first embodiment of the present invention, an element which causes a slip when an excessive torque is applied (torque limiter 14) is provided in the high speed, low torque transmission (front stage of the reduction gear group). In this second embodiment, however, such element is provided in the low speed, high torque transmission (back stage of the reduction gear group), whereby the torque can be easily controlled.

A first variant of the second embodiment will be explained herebelow with reference to FIGS. 15 to 19. This variant is an improved version of the second embodiment, and so the elements indicated in these Figures with the same or similar reference numerals as or to those in Figures of the second embodiment are the same as or similar to those of the second embodiment.

Figure 15:
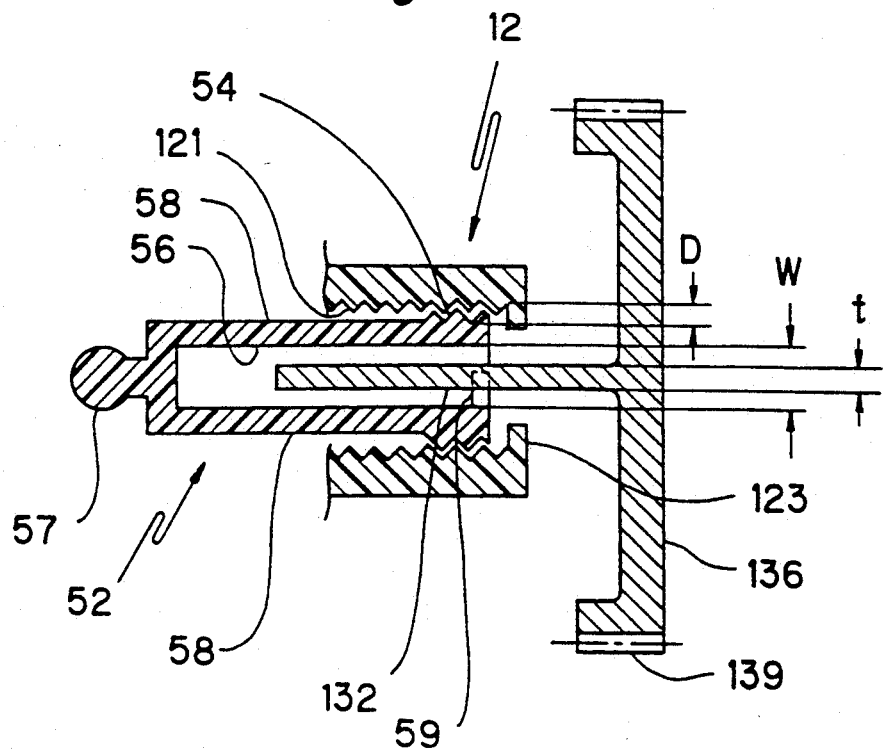
Figure 16:
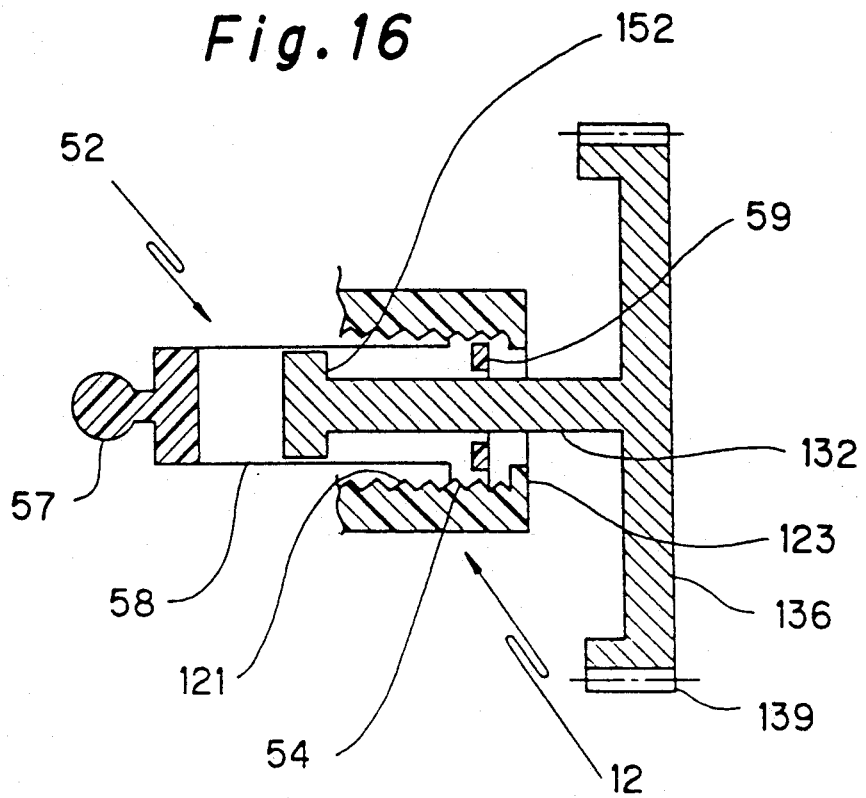
Figure 17:
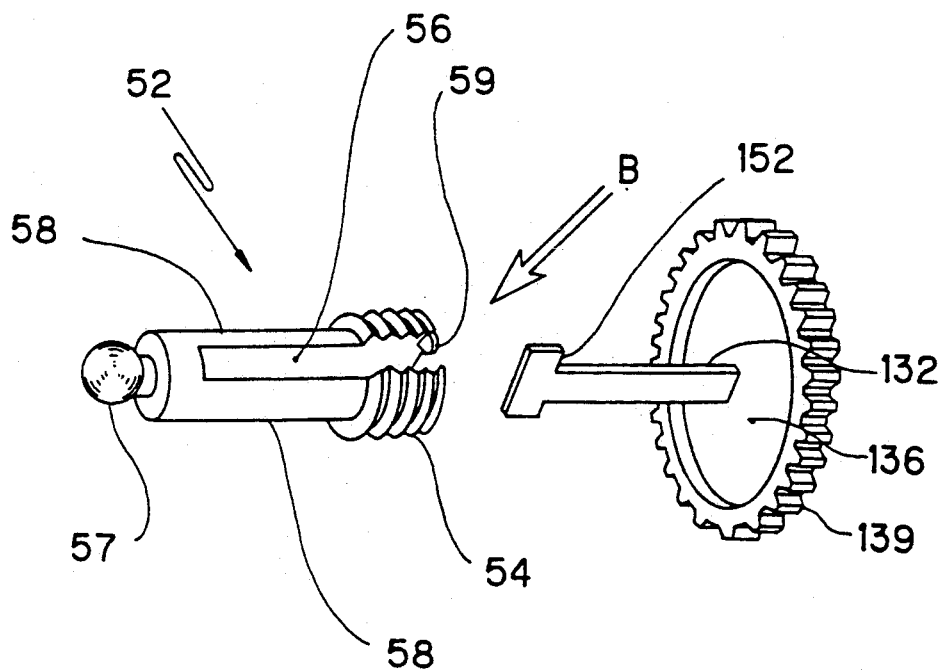

FIG. 15 is a schematic sectional view of the plunger 52 and its vicinity, FIG. 16 is a sectional view taken along a plane perpendicular to the section in FIG. 15, and FIG. 17 is an exploded perspective view of the same.

The plunger 52 has a ball 57 secured to one end thereof and a cut 56 formed from the other end thereof, and thus it takes the form of a tuning fork.

There is formed on the end portion of the tuning fork an external thread 54 which is engaged in the nut member 12.

On the other hand, there is provided a drive shaft 132 taking the form of an elongated plate of t in thickness, and it is formed integrally with a base gear 136. The drive shaft 132 has integrally formed therewith at the end thereof a T-shaped stopper 152 which prevents the drive shaft 132 from coming out.

A pair of arms 58 having the cut 56 between them and thus forming together the tuning fork is flexible. The arms 58 are opposite to each other with a spacing W between them.

The above dimension W is set so that W−t>2D where D is an amount of fitting between the external thread 54 and the internal thread of the nut member 12.

Figure 18:
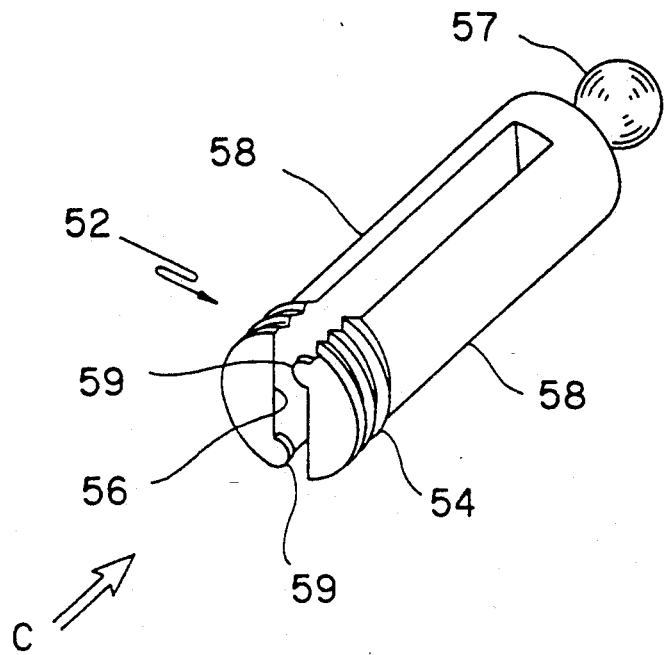
Figure 19:
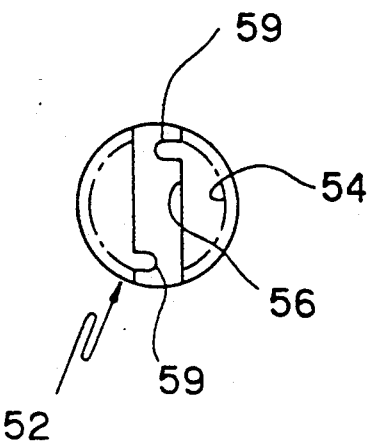

The view in the direction of arrow B in FIG. 17 is given in FIG. 18 and the view in the direction of arrow C is shown in FIG. 19.

A pair of projecting stoppers 59 is formed at the end of the plunger 52 (at the opposite end to the ball 57) and they project from the inner end face of the cut 56 in the plunger 52.

As seen from FIG. 16, these inwardly projecting stoppers 59 cooperate with the above-mentioned T-shaped projecting stopper 152 to prevent the drive shaft 132 from coming off (to the right of Figure).

Next, second to sixth variants of the present invention will be described herebelow one after another. The common matters to the first to sixth variants will be described below with reference to FIG. 5 showing the previously described first embodiment.

The first embodiment (shown in FIG. 5) is so arranged that when the mirror body 3 is tilted to the end of tilting stroke, the torque limiter 14 is activated to interrupt the power transmission in the course of the transmission of the output of the motor 103 to the transmission member 13; in the first to sixth variants, however, the base gear 136 of the transmission member 13 is provided separately from the square drive shaft 131 and a clutching means is provided at the coupling between these members so that when an excessive torque is applied, the clutching means slips, thereby interrupting the power transmission.

The difference among these first to sixth embodiments lies in construction of the clutching means (which slips when an excessive torque is applied).

In the first to sixth embodiments having such clutching means, such a means as the torque limiter 14 provided in the first embodiment (in FIG. 5) may be omitted, but it may be provided of course.

Figure 20:
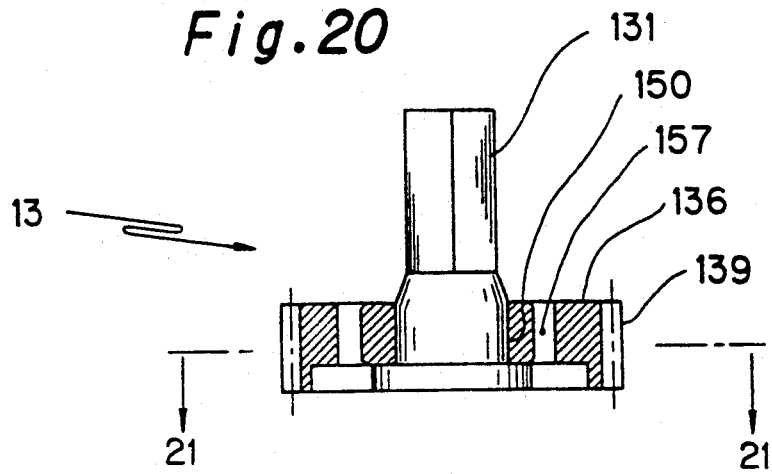
Figure 21:
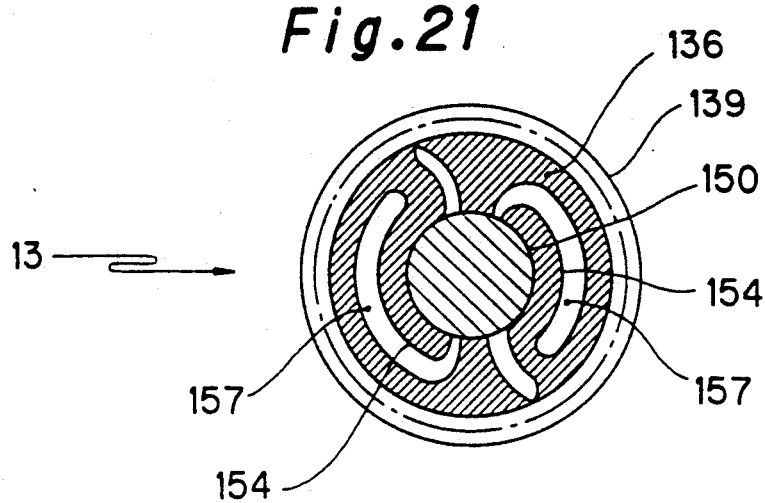
Figure 22:
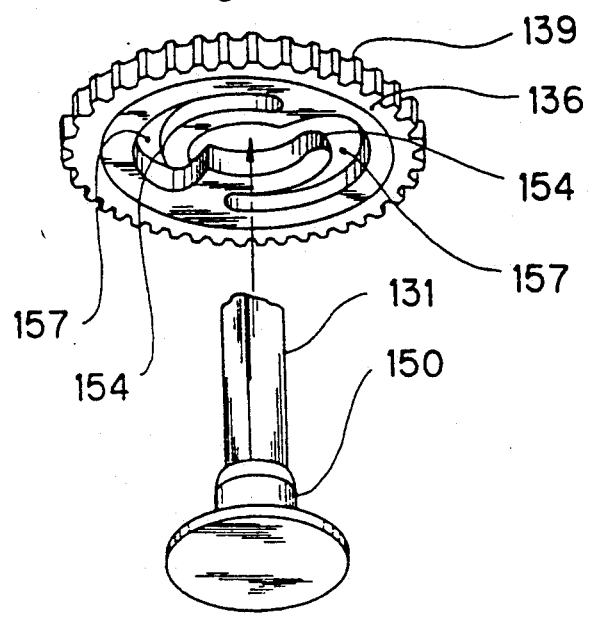

FIGS. 20 to 22 show the second variant of the present invention. FIG. 20 is a schematic drawing of the aforementioned transmission member 13. Note that FIG. 20 provides an illustration for easy understanding of the construction and function and so it does not necessarily show the real arrangement.

The reference numeral 131 indicates a square drive shaft fitted in a base gear 136 and connected to the latter by means of a frictional transmission 150. The reference numeral 139 indicates the teeth of the base gear 136.

The sectional view taken along the line XXI-XXI including the above-mentioned frictional transmission 150 is given in FIG. 21. FIG. 22 is an exploded perspective view of the aforementioned transmission member 13.

The frictional transmission 150 formed integrally with the above square drive shaft 131 is designed cylindrical and takes the form of a circle in the sectional view taken along the line XXI—XXI.

On the other hand, recesses 157 are formed in the base gear 136 in which leaf spring-like frictional pieces 154 are formed as the result of the formation of the recesses 157. The frictional pieces 154 are forced to the frictional transmission 150 to transmit the rotation of the base gear 136 to the square drive shaft 131.

In the second variant, since the power is transmitted due to the friction between the frictional pieces 154 and the frictional transmission 150, the frictional transmission 150 slips when an excessive torque is applied, thereby preventing the components of the transmission system from being damaged. The other functions and effect of this variant are similar to those of the previously mentioned first embodiment.

FIGS. 23 to 25 show a third variant of the present invention. FIG. 23 is a sectional view corresponding to FIG. 20 for the second variant, FIG. 24 is a sectional view taken along the line XXIV—XXIV in FIG. 23 and FIG. 25 is an exploded perspective view.

The elements indicated in FIG. 23 with the same reference numerals as in FIG. 22 are the same or similar ones as or to those of the second embodiment.

In the above-mentioned second variant, leaf spring-like frictional pieces 154 are formed in the base gear 136 as the result of the formation of the recesses 157 in the base gear 136 and forced to the cylindrical frictional transmission 150. In this third variant, however, a pair of wire springs 165 is so provided on the base gear 136 as to force the frictional transmission 150 between them. The reference numeral 162 indicates steps for installing the wire springs 165. The third variant also has similar functions and effect to those of the above-mentioned second variant.

Next, the fourth to sixth variants of the present invention will be described herebelow. These variants are the improved versions, respectively, of the second variant having been explained above. The technical improvements are as follows.

If the mirror is stopped from tilting by the stopper when tilted, for example, from the rear-viewing position for ordinary car drive to that for rear-wheel check, the inertia of the rotary members of the drive system may possibly cause a nearly half override of the external thread on the internal thread, resulting in such a sticking between the threads that no return of the mirror to the rear-viewing position for ordinary car drive shown in FIG. 7 is possible. To avoid this, it is desirable that when the mirror is tilted from the rear-viewing position for ordinary car drive to that for rear-wheel check, the clutching means slips when a relatively small torque is applied and that when the mirror is returned from the rear-viewing position for rear-wheel check to that for ordinary car drive, the clutching means transmits a relatively large torque. For this purpose, the fourth to sixth variants are so arranged that a slip-causing torque is changed correspondingly to the rotating direction of the clutching means.

FIGS. 26 to 29 show a fourth variant of the present invention. Note that FIG. 26 provides an illustration for easy understanding of the construction and function and so it does not necessarily show the real arrangement.

The reference numeral 131 indicates a square drive shaft fitted in a base gear 136 by means of an engagement portion thereof. The reference numeral 139 indicates the teeth of the base gear 136.

The sectional view taken along the line XXVII—XXVII including the above engagement portion 151 is given in FIG. 27.

The engagement portion 151 formed integrally with the square drive shaft 131 is nearly circular in the section taken along the line XXVII—XXVII and has a pair of V-shaped engagement recesses 153 formed therein.

On the other hand, the base gear 136 has formed therein engagement recesses 157 in which engagement pawls 155 are formed in similar shapes, respectively, to those of the corresponding recesses 157. The engagement pawls 155 are engaged in the corresponding recesses 153 to transmit the rotation of the base gear 136 to the engagement portion 151 of the square drive shaft 131.

Figure 28:
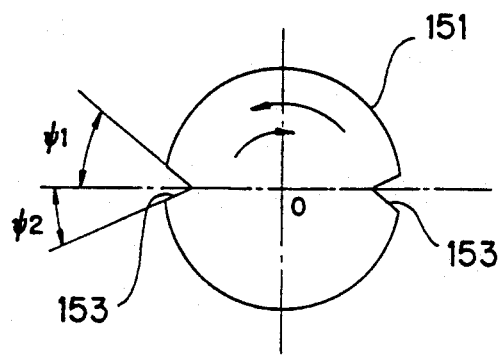

The shape of the engagement portion 151 is shown in FIG. 28.

The aforementioned V-shaped engagement recesses 153 in pair are symmetrical to each other with respect to the center point O, and the angles $\psi_1$ and $\psi_2$ shown are not equal to each other but $\omega_1 > \psi_2$.

For the simplicity of illustration, the rotation of the base gear 136 for tilting down the mirror body 3 shown in FIG. 5 will be called "forward rotation" while the rotation for tilting up the mirror body 3 be called "reverse rotation".

If a large resistance is applied against rotation of the square drive shaft 131 when the base gear 136 is rotated by the motor 103 (FIG. 5) to rotate the engagement portion 151 by means of the engagement pawls 155 and engagement recesses 153, the engagement pawls 155 are disengaged from the engagement recesses 153, whereby the transmission is interrupted and the base gear 136 rotates idly.

Since $\psi_1 > \psi_2$ as mentioned above, the transmittable reverse rotation torque is greater than the transmittable forward rotation torque. That is, when a resistance is applied to the driven side, the engagement pawl 155 is easily disengaged from the engagement recess 153 during a forward rotation, but not easily during a reverse rotation. Hence, there will not possibly be caused any nearly half override of the external thread of the transmission member on the internal thread, resulting in such a sticking between the threads.

Figure 29:
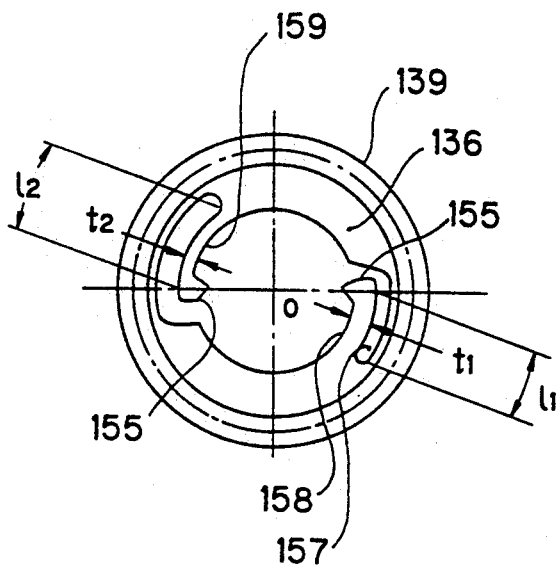

FIG. 29 is an explanatory drawing showing the shape of the aforementioned base gear 136. The engagement pawls 155 in pair are formed on the respective ends of the arms 158 and 159 which work as leaf spring.

In this variant, the length $l_2$ of the arm 158 is greater than the length $l_1$ of the arm 159, while the thickness $t_2$ of the arm 159 is smaller than the thickness $t_1$ of the arm 158, so that the spring constant of the arm 158 is larger than that of the arm 159. Thus, by appropriately setting the shape and dimensions of the engagement recesses 153 and engagement pawls 155 as well as those of the arms 158 and 159, a wide variety of the characteristic of the transmission by the engagement pawls and recesses can be freely selected as necessary.

Figure 30:
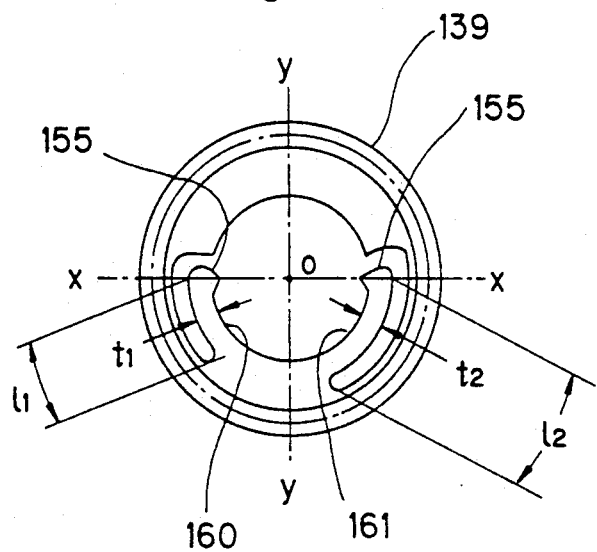
FIG. 30 is a plan view of the base gear, showing a fifth variant of the present invention.
Figure 31:
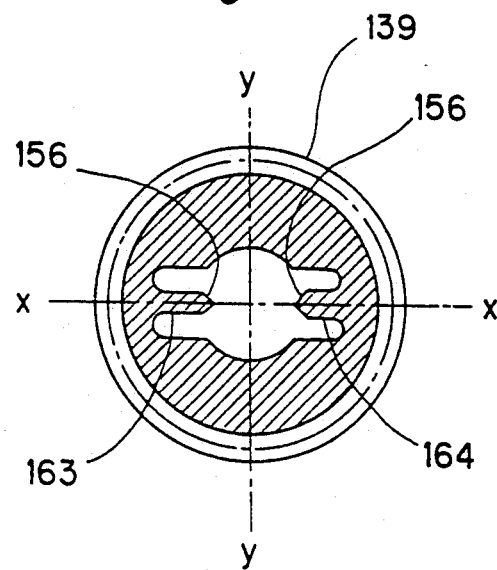
FIG. 31 is a plan view of a sixth embodiment of the present invention, in which hatching is made for facilitating to read the drawing.

FIGS. 30 and 31 show the fifth and sixth variants, respectively, of the present invention.

In the fourth variant shown in FIG. 29, the engagement pawls 155 and arms 158 and 159 are arranged nearly symmetrically to each other with respect to the point O (point symmetry), while in the fifth variant shown in FIG. 30, the arms 160 and 161 are arranged symmetrically to each other with respect to the diameter y—y (linear symmetry).

Also in this fifth variant, the length $l_1$ and $l_2$ and the thickness $t_1$ and $t_2$ of the arms 160 and 161 in pair can be appropriately selected to freely set the spring constant of the arms 160 and 161, whereby the same functions and effect as in the fourth embodiment can be assured.

In the sixth variant shown in FIG. 31, the engagement pawls 156 in pair and the arms 163 and 164 are arranged symmetrically to each other with respect to the two diameters x-x and y-y perpendicular to each other (linear symmetry). Also in this variant, the sticking between the external and internal threads can be prevented as in the aforementioned fourth and fifth variants.

Next, the third embodiment and seventh variant of the present invention will be described with reference to FIGS. 32 to 34. According to these embodiment and variant, the tilting stroke of the mirror is limited inside the drive casing 1, not by any stopper outside the drive casing 1.

Figure 32:
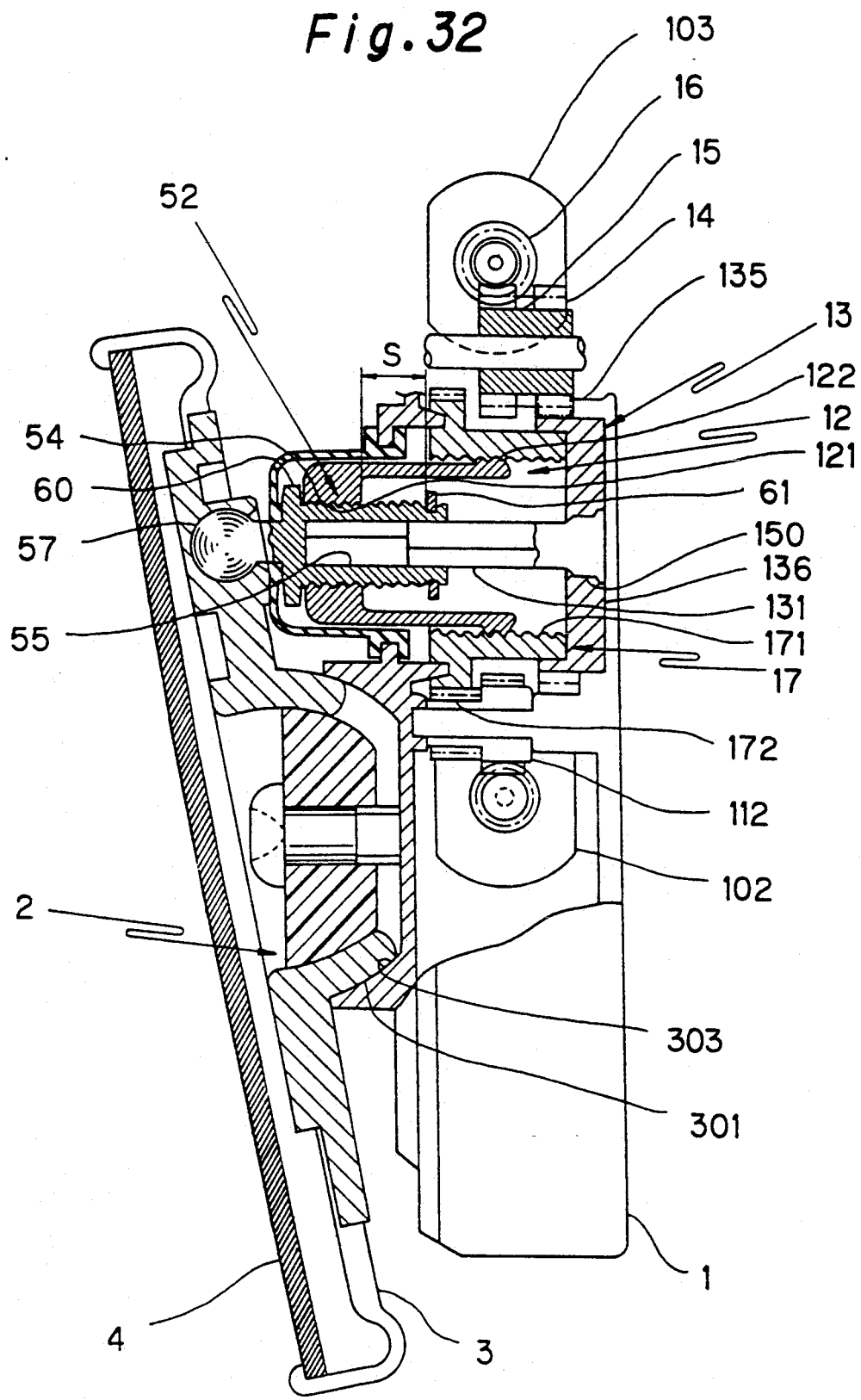

FIG. 32 is a sectional view of the third embodiment, and it corresponds to FIG. 5 of the first embodiment.

The base gear 136 and square drive shaft 131 are provided separately from each other and coupled to each other by means of the frictional transmission 150.

Stoppers 60 and 62 are provided at opposite ends, respectively, of the external thread 54 of the plunger 52 to limit to a value s the moving stroke of the nut member 12 relative to the internal thread 122.

Figure 33:
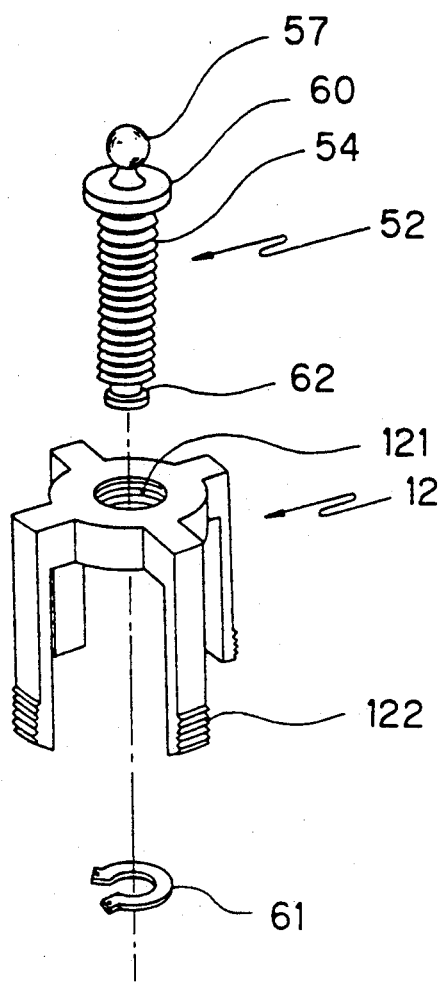

The plunger 52, stoppers 60 and 62 and nut member 12 are shown in the exploded perspective view in FIG. 33.

The stopper 60 is integrally formed at the end of the plunger 52 where the ball 57 is formed. This stopper takes the form of a flange. The plunger 52 has formed at the other end thereof and an annular groove 62 in which a stopper ring (so-called "snap ring") 61 is fitted.

With this third embodiment, the drive system (mechanism housed in the drive casing 1) permits to accurately limit the tilting stroke of the mirror body 3 without using any external stopper.

Figure 34:
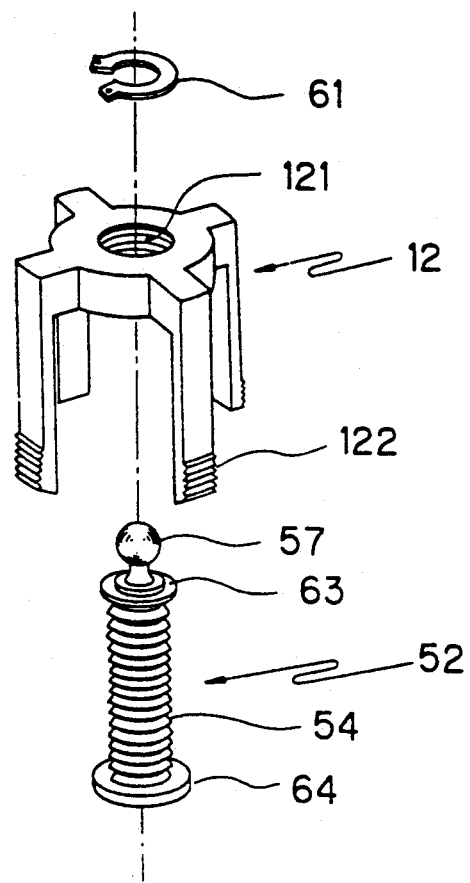
FIG. 34 is an exploded perspective view of the present invention, corresponding to FIG. 33 for the third embodiment.

FIG. 34 is an exploded perspective view showing the seventh variant. This Figure corresponds to FIG. 33 showing the third embodiment.

In this variant, the plunger 52 is provided with a ball 57 at one end thereof and a flange-like stopper 64 at the other end, and further it has provided near the base of the ball 57 an annular groove 63 in which a stopper ring 61 is fitted.

The third embodiment (FIG. 33) and seventh variant (FIG. 34) are of a same structure in which stopping means are provided at opposite ends, respectively, to limit the moving stroke.

Application of either the third embodiment or the seventh variant for embodying the present invention is freely selectable taking the following in consideration:

The flange-like stopper 64 is more excellent than the stopper ring 61 in accuracy of positioning for stopping the movement of the external thread 54 relative to the internal thread 122 of the nut member 12.

Generally, the accuracy of mirror tilting should desirably be higher when the mirror is returned to the rear-viewing position for ordinary car drive than when the mirror is tilted to that for rear-wheel check.

Therefore, the third embodiment should preferably be adopted for a structure in which the mirror body is tilted to the rear-viewing position for rear-wheel check when the plunger is extended (moved forwardly) while the mirror body is returned to the position for ordinary car drive when the plunger is retracted (moved reversely), because of the arrangement of the components.

For a structure in which the mirror body is returned to the rear-viewing position for ordinary car drive when the plunger is extended, the seventh variant should preferably be adopted.

FIGS. 35 to 38 show the eighth variant of the present invention. Also in this variant, when an excessive torque is applied, there occurs a slip between the base gear 136 and square drive shaft 131 as in the fourth to sixth variants having been previously described. However, this variant is so constructed that the minimum torque for causing a slip when a large torque is applied can be easily controlled.

Figure 35:
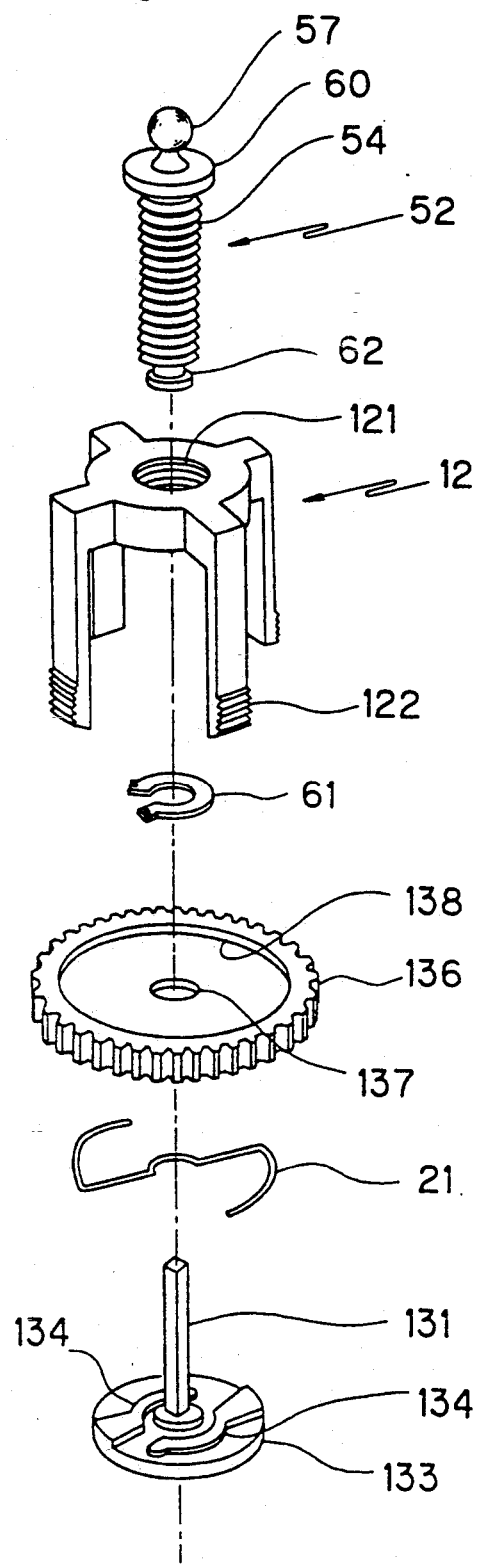

FIG. 35 is an exploded perspective view of the essential parts, of which the upper half is similar to that shown in FIG. 33.

The square drive shaft 131 has a flange 133 integrally formed therewith. The square drive shaft 131 is inserted through a central hole 137 in the base gear 136 and thus the flange 133 is placed near the base gear 136. A circular Z-shaped spring 21 is put between the flange 133 and base gear 136.

The central portion of the circular Z-shaped spring 21 is engaged to a pair of protrusions 134 formed on the flange 133 so that the spring 21 is blocked against any rotation relative to the flange 133.

The two near-end portions of the circular Z-shaped spring 21 are bent into circular forms as shown, so that these two portions are forced to the inner wall of the rim 138 of the base gear 136 under the effect of their resilience.

Figure 36:
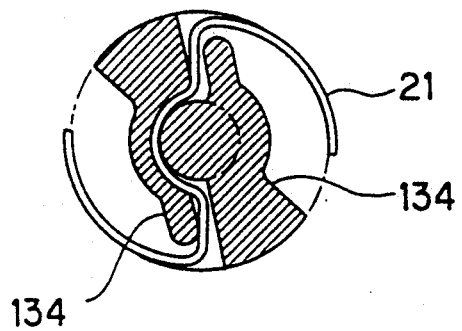

FIG. 36 is an explanatory drawing being a partial sectional view, taken by a plane perpendicular to the square drive shaft, of the engagement protrusions 134 of the flange 133, showing the engagement of the circular Z-shaped spring 21 on the protrusions 134.

Figure 37:
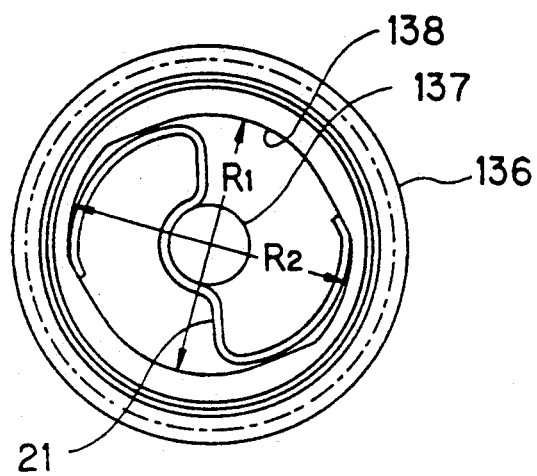

FIG. 37 is a schematic drawing showing the forced contact of the circular Z-shaped spring 21 with the inner circumference (inner wall) of the rim 138 of the base gear 136.

The inner circumference of the rim 138 has a small-diameter portion ($R_1$) and a large-diameter portion ($R_2$). When the mirror body is tilted to the position for ordinary run, the spring 21 is in contact with the large-diameter portion $R_2$ and rotates along with the base gear 136 because of the friction between them.

Figure 38:
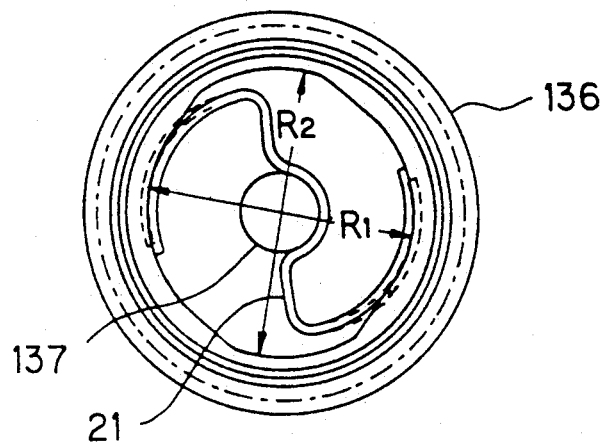

When the plunger 52 being the driven side has come to the stroke end and so cannot rotate any further, the square drive shaft 131 and flange 133 stop moving and also the circular Z-shaped spring 21 forced to the flange 133 stops. When the base gear 136 keeps rotating in this condition, the near-end portions of the spring 21 repeatedly ride on the respective small-diameter portions $R_1$ as shown in FIG. 38 and fall to the respective large-diameter portions $R_2$ as shown in FIG. 37. Thus, the drive-side base gear 136 idly rotates.

As seen from FIGS. 37 and 38, the minimum torque with which the base gear 136 starts slipping relative to the circular Z-shaped spring 21 during forward rotation and such torque during reverse rotation can be freely set by appropriately setting a shape and dimensions of the inner circumference of the rim 138 of the base gear 136.

What is claimed is:

1. An electrically remote-controlled type mirror assembly comprising:
   a mirror:
   a mirror body supporting said mirror;
   a casing having a ball-and-socket joint which supports said mirror body pivotally;
   a pair of plungers coupled with said mirror body and so disposed within said casing as to be moved forward and backward by a pair of motors, respectively, by means of reduction gear trains, respectively, to tilt said mirror body horizontally and vertically within certain pivoting angles;
   at least one of said plungers having an external thread formed on the outer circumference thereof and having a central hole provided along the center line thereof;
   at least one nut member having an internal thread engaging said external thread of said one of the plungers and having at least one external thread member provided on the outer circumference thereof;
   at least one hollow driving cylinder having formed on the inner circumference thereof an internal thread engaging said external thread member, and having formed on the outer circumference thereof a last-stage gear of said reduction gear train;
   wherein said one of said plungers is moved together with said nut member to tilt said mirror body within said certain pivoting angles when said at least one driving cylinder is rotated by said motor, and
   at least one driving mechanism having another motor and other gear train which is driven by said another motor to rotate said one of the plungers relative to said nut member to tilt said mirror body beyond one of said certain pivoting angles;
   wherein said driving mechanism includes,
   a driving shaft member including a rotary member having formed on the outer circumference thereof a last-stage gear of said another gear train, and a shaft slidably fitted in said central hole of said plunger so as to be blocked against pivoting relative to the plunger.
   said another motor which drives said another gear train, and
   a stopper means of limiting said pivoting angle of said mirror body, and
   wherein said one of the plungers screws forward and backward relative to said nut member to tilt said mirror body beyond said certain pivoting angles when said driving shaft member is rotated by said another motor.

2. An electrically remote-controlled mirror assembly according to claim 1, further comprising:
   a clutch means provided between said driving shaft member and said another motor to interrupt a power transmission to said driving shaft member from said another motor when a greater torque than a predetermined one is received, thereby interrupting a power transmission to said drive shaft member from said another motor.

3. An electrically remote-controlled mirror assembly according to claim 2, wherein:
   said shaft and said rotary member in said driving shaft member are formed separately; and
   wherein said clutch means comprises a spring member so provided between said rotary member and said shaft as to produce frictional coupling therebetween.

4. An electrically remote-controlled mirror assembly according to claim 3, wherein said spring member is fixed to said rotary member.

5. An electrically remote-controlled mirror assembly according to claim 2,
   wherein said shaft and said rotary member in said driving shaft member are formed separately;
   wherein said clutch means comprises
   engagement pawls elastically supported to said rotary member, and
   engagement recesses provided on said shaft; and
   wherein said predetermined torque is so set as to be larger when said mirror body is tilted upward than when tilted downward.

6. An electrically remote-controlled mirror assembly according to claim 1, wherein said stopper means is adapted to limit a relative moving stroke between said one of the plungers and said nut member.

7. An electrically remote-controlled type mirror assembly comprising:
   a mirror;
   a mirror body supporting said mirror;
   a casing having a ball-and-socket joint which supports said mirror body pivotally;
   a pair of plungers coupled with said mirror body and so disposed within said casing as to be moved forward and backward by a pair of motors, respectively, by means of reduction gear trains, respectively, to tilt said mirror body horizontally and vertically within certain pivoting angles.
   at least one of said plungers having an external thread formed on the outer circumference thereof and having a cut provided along the center line thereof;
   at least one nut member having an internal thread engaging said external thread of said one of the plungers and having at least one external thread member provided on the outer circumference thereof;
   at least one hollow driving cylinder having formed on the inner circumference thereof an internal thread engaging said external thread member, and having formed on the outer circumference thereof a last-stage gear of said reduction gear train;
   wherein said one of the lungers is moved together with said nut member to tilt said mirror body within said certain pivoting angles when said at least one driving cylinder is rotated by said motor,
   at least one driving mechanism having another motor and another gear train which is driven by said another motor to rotate said one of the plungers relative to said nut member to tilt said mirror body beyond one of said certain pivoting angles;
   wherein said driving mechanism includes, a driving shaft member including a shaft slidably fitted in said cut of said one of the plungers so as to be blocked against pivoting relative to the plunger, and a rotary member having formed on the outer circumference thereof a last stage gear of said another gear train; and a stopper means for limiting said pivoting angle of said mirror body, and wherein said one of the plungers screws forward and backward relative to said nut member to tilt said mirror body beyond said certain pivoting angles when said driving shaft member is rotated by said another motor.

8. An electrically remote-controlled mirror assembly according to claim 7, further comprising:

a clutch means for interrupting a power transmission to said drive shaft member from said another motor when a greater torque than a predetermined one is received;

wherein said at least one of the plungers is provided with a pair of arms having formed therebetween said cut of a width W, and having said external thread formed on each of said arms whereby giving flexibility to said one of the plungers, wherein said shaft is formed as an elongated plate with t in thickness and W in height, and the amount D of engagement between said external thread of said arms and said internal thread of said nut member is defined by $2D < W - t$, and whereby disengagement occurs between said external thread of said arms and said internal thread of said nut member when said arms are deflected inwardly to be closely fitted to said elongated plate due to said greater torque.

9. An electrically remote-controlled mirror assembly according to claim 7, further comprising:

a T-shaped projection provided at a top of said shaft of said driving shaft member; and stoppers projecting inwardly from inner end faces, respectively, of said cut of said one of the plungers;

whereby said one of the plungers is prevented from coming off said cut when said T-shaped projection and said stoppers abut each other.

10. An electrically remote-controlled mirror assembly according to claim 7, wherein said stopper means is adapted to limit a relative moving stroke between said one of the plungers and said nut member.

* * * * *